United States Patent
Huang et al.

(10) Patent No.: US 11,490,403 B2
(45) Date of Patent: Nov. 1, 2022

(54) DATA TRANSMISSION METHOD AND DATA TRANSMISSION DEVICE

(71) Applicant: CHINA ACADEMY OF TELECOMMUNICATIONS TECHNOLOGY, Beijing (CN)

(72) Inventors: Qiuping Huang, Beijing (CN); Runhua Chen, Beijing (CN); Qiubin Gao, Beijing (CN); Rakesh Tamrakar, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 129 days.

(21) Appl. No.: 16/969,151

(22) PCT Filed: Feb. 12, 2019

(86) PCT No.: PCT/CN2019/074819
§ 371 (c)(1),
(2) Date: Aug. 11, 2020

(87) PCT Pub. No.: WO2019/154423
PCT Pub. Date: Aug. 15, 2019

(65) Prior Publication Data
US 2021/0045140 A1 Feb. 11, 2021

(30) Foreign Application Priority Data

Feb. 12, 2018 (CN) .......................... 201810147591.3

(51) Int. Cl.
*H04W 72/04* (2009.01)
*H04W 72/12* (2009.01)

(52) U.S. Cl.
CPC ... *H04W 72/1268* (2013.01); *H04W 72/1289* (2013.01)

(58) Field of Classification Search
None
See application file for complete search history.

(56) References Cited

U.S. PATENT DOCUMENTS

| | | | |
|---|---|---|---|
| 10,367,677 B2* | 7/2019 | Parkvall | H04J 11/0079 |
| 10,374,839 B2* | 8/2019 | Park | H04L 25/03006 |

(Continued)

FOREIGN PATENT DOCUMENTS

| | | |
|---|---|---|
| CN | 103986566 A | 8/2014 |
| CN | 107026724 A | 8/2017 |

(Continued)

OTHER PUBLICATIONS

Extended European Search Report from EP app. No. 19751849.1, dated Mar. 2, 2021.

(Continued)

*Primary Examiner* — Sai Aung
(74) *Attorney, Agent, or Firm* — Ladas & Parry, LLP

(57) ABSTRACT

A data transmission method and a data transmission device are provided. The method includes: receiving first indication information sent by a network side device, the first indication information is used to instruct the UE to send a first signal; and determining actual first uplink transmission characteristic of the first signal when valid first uplink transmission characteristic of the first signal is not obtained, and sending the first signal through the actual first uplink transmission characteristic, or not sending the first signal when valid first uplink transmission characteristic of the first signal is not obtained.

20 Claims, 4 Drawing Sheets

(56) References Cited

U.S. PATENT DOCUMENTS

| | | | |
|---|---|---|---|
| 2015/0172950 A1 | 6/2015 | Chen et al. | |
| 2017/0134964 A1* | 5/2017 | Yu | H04L 1/16 |
| 2017/0150337 A1 | 5/2017 | Bareket et al. | |
| 2017/0311322 A1 | 10/2017 | Kim et al. | |
| 2018/0034525 A1 | 2/2018 | Park et al. | |
| 2019/0045544 A1 | 2/2019 | Wang et al. | |
| 2019/0166503 A1 | 5/2019 | Ahn et al. | |
| 2019/0379501 A1* | 12/2019 | Park | H04L 5/0048 |
| 2020/0037345 A1* | 1/2020 | Ryoo | H04W 76/27 |

FOREIGN PATENT DOCUMENTS

| | | | |
|---|---|---|---|
| EP | 3240224 A1 | 11/2017 | |
| KR | 10-2016-0106092 A | 9/2016 | |
| WO | 2017191939 A1 | 11/2017 | |
| WO | WO-2019027297 A1 * | 2/2019 | H04W 16/14 |

OTHER PUBLICATIONS

Written Opinion of the International Searching Authority from PCT/CN2019/074819, dated May 17, 2019, with English translation from WIPO.

International Search Report from PCT/CN2019/074819, dated May 17, 2019, with English translation from WIPO.

International Preliminary Report on Patentability from PCT/CN2019/074819, dated Aug. 18, 2020, with English translation from WIPO.

First Office Action from TW app. No. 108104641, dated Apr. 14, 2020, with machine English translation.

"UL beam management", R1-1706925, 3GPP TSG RAN WG1 Meeting #89, Hangzhou, China, May 15-19, 2017.

Notification of Reason for Refusal from KR app. No. 10-2020-7025776, dated Dec. 7, 2021, with English translation from Global Dossier, all pages.

* cited by examiner

DATA TRANSMISSION METHOD AND DATA TRANSMISSION DEVICE

CROSS-REFERENCE TO RELATED APPLICATIONS

The present application is the U.S. national phase of PCT Application No. PCT/CN2019/074819 filed on Feb. 12, 2019, which claims a priority to the Chinese patent application No. 201810147591.3 filed on Feb. 12, 2018, the disclosures of which are incorporated herein by reference in their entireties.

TECHNICAL FIELD

The present disclosure relates to the technical field of communication technology, in particular to a data transmission method and a data transmission device.

BACKGROUND

In the uplink signal transmission scheduling and instruction, there is an ambiguous time period in which uplink transmission characteristics are not clearly defined. During this ambiguous time period, how a base station and a user equipment (UE) determine the uplink signal transmission is an unresolved problem. If the UE arbitrarily determines the uplink transmission characteristics during this time period, it may cause the base station to be unable to perform corresponding reception, thereby affecting system performance.

SUMMARY

The purpose of the technical solution of the present disclosure is to provide a data transmission method and a data transmission device, which can solve the problem that uplink reception behavior cannot be implemented due to ambiguous indication of the transmission characteristics.

In a first aspect, an embodiment of the present disclosure provides a data transmission method applied to a user equipment, including: receiving first indication information sent by a network side device, wherein the first indication information is used to instruct the UE to send a first signal; and determining actual first uplink transmission characteristic of the first signal when valid first uplink transmission characteristic of the first signal is not obtained, and sending the first signal through the actual first uplink transmission characteristic, or not sending the first signal when valid first uplink transmission characteristic of the first signal is not obtained.

In some embodiments, the method further includes: determining whether the UE has obtained the valid first uplink transmission characteristic of the first signal.

In some embodiments, the determining whether the UE has obtained the valid first uplink transmission characteristic of the first signal includes: determining whether the UE uses first uplink transmission characteristic to send the first signal; determining whether the UE has obtained the valid first uplink transmission characteristic of the first signal when it is determined that the UE uses the first uplink transmission characteristic to send the first signal.

In some embodiments, the determining whether the UE uses the first uplink transmission characteristic to send the first signal includes at least one of: receiving second indication information about the first uplink transmission characteristic from the network side device, and determining whether to perform the transmission of the first signal under the first uplink transmission characteristic based on the second indication information; or determining whether third indication information has been received, and determining whether to transmit the first signal by using the first uplink transmission characteristic based on whether the third indication information has been received; or determining whether fourth indication information has been received, and determining whether to transmit the first signal by using the first uplink transmission characteristic based on whether the fourth indication information has been received, wherein the fourth indication information is used to indicate not to use the first uplink transmission characteristic for the transmission of the first signal any more.

In some embodiments, the determining the actual first uplink transmission characteristic of the first signal includes: determining the actual first uplink transmission characteristic of the first signal based on a downlink reception signal; or determining that the actual first uplink transmission characteristic of the first signal is the same as the first uplink transmission characteristic of a signal associated with the first signal.

In some embodiments, after determining the actual first uplink transmission characteristic of the first signal, the method further includes: sending indication information of the actual first uplink transmission characteristic to the network side device.

In some embodiments, the indication information of the actual first uplink transmission characteristic includes: indication information for indicating one or more channel state information reference signal (CSI-RS) resource from a plurality of CSI-RS resources configured by the network side device for the UE for beam management, wherein the plurality of CSI-RS resources for beam management comprises at least one of CSI-RS resources for uplink beam management and CSI-RS resources for downlink beam management; or indication information for indicating one or more CSI-RS resource from a plurality of CSI-RS resources configured by the network side device for the UE for downlink CSI acquisition; or indication information for indicating one or more downlink demodulation reference signal (DMSR) ports from downlink DMRS ports configured by the network side device for the UE; or indication information for indicating one SRS resource from the SRS resources configured by the network side device for the UE.

In some embodiments, the sending the indication information of the actual first uplink transmission characteristic to the network side device includes: sending the indication information of the actual first uplink transmission characteristic to the network side device through another first signal; or sending the indication information of the actual first uplink transmission characteristic to the network side device through the first signal.

In some embodiments, the actual first uplink transmission characteristic of the first signal refers to any one of: valid first uplink transmission characteristic obtained most recently among all valid first uplink transmission characteristics obtained by the UE; valid first uplink transmission characteristic obtained most recently among all valid first uplink transmission characteristics of the first signal obtained by the UE; first uplink transmission characteristic used most recently among all the first uplink transmission characteristics used by the UE; first uplink transmission characteristic used most recently among all the first uplink transmission characteristics used by the UE to send the first signal; and default first uplink transmission characteristic.

In some embodiments, when the actual first uplink transmission characteristic of the first signal is the valid first uplink transmission characteristic obtained most recently among all the valid first uplink transmission characteristics obtained by the UE, the valid first uplink transmission characteristic obtained most recently refers to: one pre-defined first uplink transmission characteristics among the N first uplink transmission characteristics configured by radio resource control (RRC) most recently, and N is greater than or equal to 1; or when the actual first uplink transmission characteristic of the first signal is the valid first uplink transmission characteristic obtained most recently among all the valid first uplink transmission characteristics of the first signal obtained by the UE, the valid first uplink transmission characteristic obtained most recently refers to: one pre-defined first uplink transmission characteristics among the N first uplink transmission characteristics corresponding to the first signal configured by RRC most recently, N is greater than or equal to 1; or the valid first uplink transmission characteristic obtained most recently refers to: the first uplink transmission characteristic activated by media access control layer control unit (MAC-CE) most recently.

In some embodiments, the default first uplink transmission characteristic refers to any one of: first uplink transmission characteristic used for the transmission of a third message Msg3 in a most recent random access channel (RACH) process; one pre-defined first uplink transmission characteristics among the N first uplink transmission characteristics configured by RRC most recently, N is greater than or equal to 1; and the first uplink transmission characteristic activated by MAC-CE most recently.

In some embodiments, the predefined first uplink transmission characteristic refers to first uplink transmission characteristic with a lowest serial number.

In some embodiments, the valid first uplink transmission characteristic of the first signal is not obtained includes at least one of: the UE has not received the configuration information of the first uplink transmission characteristic of the first signal; the UE has received the configuration information of the first uplink transmission characteristic of the first signal, but the UE has not received activation information corresponding to the configuration information; the UE has received the configuration information of the first uplink transmission characteristic of the first signal and the activation information corresponding to the configuration information, but the first uplink transmission characteristic of the first signal is not valid yet; the UE has received reconfiguration information of the first uplink transmission characteristic of the first signal, but the UE has not received the activation information corresponding to the reconfiguration information; the UE has received the reconfiguration information of the first uplink transmission characteristic of the first signal and the activation information corresponding to the reconfiguration information, but the first uplink transmission characteristic information of the first signal corresponding to the activation information is not valid yet; and the UE has received reactivation information of the first uplink transmission characteristic, but the first uplink transmission characteristic of the first signal corresponding to the reactivation information is not valid yet.

In some embodiments, the first uplink transmission characteristic is an uplink transmission beam.

In a second aspect, a data transmission method applied to network side device, including: sending first indication information to a user equipment (UE), wherein the first indication information is used to instruct the UE to send a first signal; determining a receiving mode corresponding to actual first uplink transmission characteristic of the first signal when valid first uplink transmission characteristic of the first signal is not sent to the UE, and receiving the first signal by the receiving mode, or not receiving the first signal on a resource scheduled for the first signal when valid first uplink transmission characteristic of the first signal is not sent to the UE.

In some embodiments, the method further includes at least one of: sending second indication information to the UE, wherein the second indication information is used to indicate whether the UE performs the transmission of the first signal under the first uplink transmission characteristic; or sending third indication information to the UE, wherein the third indication information is used to instruct the UE to use the first uplink transmission characteristic to transmit the first signal; or sending fourth indication information to the UE, wherein the fourth indication information is used to instruct the UE to no longer use the first uplink transmission characteristic to perform the transmission of the first signal.

In some embodiments, the method further includes: obtaining indication information of the actual first uplink transmission characteristic of the first signal sent by the UE.

In some embodiments, the obtaining the indication information of the actual first uplink transmission characteristic of the first signal sent by the UE includes: obtaining the indication information of the actual first uplink transmission characteristic through another first signal or the first signal.

In some embodiments, the indication information of the actual first uplink transmission characteristic includes: indication information for indicating one or more channel state information reference signal (CSI-RS) resource from a plurality of CSI-RS resources configured by the network side device for the UE for beam management, wherein the plurality of CSI-RS resources for beam management comprises at least one of CSI-RS resources for uplink beam management and CSI-RS resources for downlink beam management; or indication information for indicating one or more CSI-RS resource from a plurality of CSI-RS resources configured by the network side device for the UE for downlink CSI acquisition; or indication information for indicating one or more downlink demodulation reference signal (DMSR) ports from downlink DMRS ports configured by the network side device for the UE; or indication information for indicating one SRS resource from the SRS resources configured by the network side device for the UE.

In some embodiments, the actual first uplink transmission characteristic refers to any one of: valid first uplink transmission characteristic sent most recently among all valid first uplink transmission characteristics sent to the UE; valid first uplink transmission characteristic sent most recently among all valid first uplink transmission characteristics of the first signal sent to the UE; first uplink transmission characteristic used most recently among all the first uplink transmission characteristics used by the UE; first uplink transmission characteristic used most recently among all the first uplink transmission characteristics used by the UE to send the first signal; and default first uplink transmission characteristic.

In some embodiments, when the actual first uplink transmission characteristic of the first signal is the valid first uplink transmission characteristic sent most recently among all the valid first uplink transmission characteristics sent to the UE, the valid first uplink transmission characteristic sent most recently refers to: one pre-defined first uplink transmission characteristics among the N first uplink transmission characteristics configured by radio resource control (RRC) most recently, and N is greater than or equal to 1; or when the actual first uplink transmission characteristic of the first signal is the valid first uplink transmission characteristic sent most recently among all the valid first uplink transmission characteristics of the first signal sent to the UE, the valid first uplink transmission characteristic sent most recently refers to: one predefined first uplink transmission characteristics among the N first uplink transmission characteristics corresponding to the first signal configured by RRC most recently, N is greater than or equal to 1; or, the valid first uplink transmission characteristic sent most recently refers to: the first uplink transmission characteristic activated by media access control layer control unit (MAC-CE) most recently.

In some embodiments, the default first uplink transmission characteristic refers to any one of: first uplink transmission characteristic used for the transmission of a third message Msg3 in a most recent random access channel (RACH) process; one pre-defined first uplink transmission characteristics among the N first uplink transmission characteristics configured by RRC most recently, N is greater than or equal to 1; and the first uplink transmission characteristic activated by MAC-CE most recently.

In some embodiments, the predefined first uplink transmission characteristic refers to the first uplink transmission characteristic with a lowest serial number.

In some embodiments, the valid first uplink transmission characteristic of the first signal is not sent to the UE includes at least one of: not sending configuration information of the first uplink transmission characteristic of the first signal to the UE; sending configuration information of the first uplink transmission characteristic of the first signal to the UE, but not sending activation information corresponding to the configuration information to the UE; sending the configuration information of the first uplink transmission characteristic of the first signal and the activation information corresponding to the configuration information to the UE, but the first uplink transmission characteristic of the first signal is not valid; sending reconfiguration information of the first uplink transmission characteristic of the first signal to the UE, but not sending the activation information corresponding to the reconfiguration information to the UE; sending the reconfiguration information of the first uplink transmission characteristic of the first signal and the activation information corresponding to the reconfiguration information to the UE, but the first uplink transmission characteristic information of the first signal corresponding to the activation information is not valid; sending reactivation information of the first uplink transmission characteristic to the UE, but the first uplink transmission characteristic of the first signal corresponding to the reactivation information is not valid.

In some embodiments, the first uplink transmission characteristic is an uplink transmission beam.

In some embodiments, the determining the receiving mode corresponding to the actual first uplink transmission characteristic of the first signal, and receiving the first signal by the receiving mode includes: determining an uplink reception beam corresponding to the actual first uplink transmission characteristic of the first signal, and receiving the first signal sent through the first uplink transmission characteristic by the uplink reception beam.

In a third aspect, a UE includes a first transceiver and a first processor, the first transceiver is configured to receive first indication information sent by a network side device, wherein the first indication information is used to instruct the UE to send a first signal; the first processor is configured to determine actual first uplink transmission characteristic of the first signal when valid first uplink transmission characteristic of the first signal is not obtained, and send the first signal through the actual first uplink transmission characteristic, or not send the first signal when valid first uplink transmission characteristic of the first signal is not obtained.

In some embodiments, the first processor is further configured to determine whether the UE has obtained the valid first uplink transmission characteristic of the first signal.

In some embodiments, the first processor is further configured to: determine whether the UE uses first uplink transmission characteristic to send the first signal; determine whether the UE has obtained the valid first uplink transmission characteristic of the first signal when it is determined that the UE uses the first uplink transmission characteristic to send the first signal.

In some embodiments, the first receiver is further configured to receive second indication information about the first uplink transmission characteristic from the network side device, and the first processor is further configured to determine whether to perform the transmission of the first signal under the first uplink transmission characteristic based on the second indication information; and/or, the first processor is further configured to determine whether third indication information has been received, and determine whether to transmit the first signal by using the first uplink transmission characteristic based on whether the third indication information has been received, the third indication information is used to instruct the UE to transmit the first signal by using the first uplink transmission characteristic; and/or, the first processor is further configured to determine whether fourth indication information has been received, and determine whether to transmit the first signal by using the first uplink transmission characteristic based on whether the fourth indication information has been received, wherein the fourth indication information is used to indicate not to use the first uplink transmission characteristic for the transmission of the first signal any more.

In some embodiments, the first processor is further configured to: determine the first uplink transmission characteristic of the first signal based on a downlink reception signal; or determine that the actual first uplink transmission characteristic of the first signal is the same as the first uplink transmission characteristic of a signal associated with the first signal.

In some embodiments, the first transceiver is further configured to send the actual indication information of the first uplink transmission characteristic to the network side device.

In some embodiments, the indication information of the actual first uplink transmission characteristic includes: indication information for indicating one or more channel state information reference signal (CSI-RS) resource from a plurality of CSI-RS resources configured by the network side device for the UE for beam management, wherein the plurality of CSI-RS resources for beam management comprises at least one of CSI-RS resources for uplink beam management and CSI-RS resources for downlink beam management; or indication information for indicating one or more CSI-RS resource from a plurality of CSI-RS resources configured by the network side device for the UE for downlink CSI acquisition; or indication information for indicating one or more downlink demodulation reference signal (DMSR) ports from downlink DMRS ports configured by the network side device for the UE; or indication information for indicating one SRS resource from the SRS resources configured by the network side device for the UE.

In some embodiments, the first transceiver is further configured to: send the indication information of the actual first uplink transmission characteristic to the network side device through another first signal; or send the indication information of the actual first uplink transmission characteristic to the network side device through the first signal.

In some embodiments, the actual first uplink transmission characteristic of the first signal refers to any one of: valid first uplink transmission characteristic obtained most recently among all valid first uplink transmission characteristics obtained by the UE; valid first uplink transmission characteristic obtained most recently among all valid first uplink transmission characteristics of the first signal obtained by the UE; first uplink transmission characteristic used most recently among all the first uplink transmission characteristics used by the UE; first uplink transmission characteristic used most recently among all the first uplink transmission characteristics used by the UE to send the first signal; and default first uplink transmission characteristic.

In some embodiments, when the actual first uplink transmission characteristic of the first signal is the valid first uplink transmission characteristic obtained most recently among all the valid first uplink transmission characteristics obtained by the UE, the valid first uplink transmission characteristic obtained most recently refers to: one pre-defined first uplink transmission characteristics among the N first uplink transmission characteristics configured by radio resource control (RRC) most recently, and N is greater than or equal to 1; or when the actual first uplink transmission characteristic of the first signal is the valid first uplink transmission characteristic obtained most recently among all the valid first uplink transmission characteristics of the first signal obtained by the UE, the valid first uplink transmission characteristic obtained most recently refers to: one pre-defined first uplink transmission characteristics among the N first uplink transmission characteristics corresponding to the first signal configured by RRC most recently, N is greater than or equal to 1; or the valid first uplink transmission characteristic obtained most recently refers to: the first uplink transmission characteristic activated by media access control layer control unit (MAC-CE) most recently.

In some embodiments, the default first uplink transmission characteristic refers to any one of: first uplink transmission characteristic used for the transmission of a third message Msg3 in a most recentmost recent random access channel (RACH) process; one pre-defined first uplink transmission characteristics among the N first uplink transmission characteristics configured by RRC most recently, N is greater than or equal to 1; and the first uplink transmission characteristic activated by MAC-CE most recently.

In some embodiments, the predefined first uplink transmission characteristic refers to the first uplink transmission characteristic with a lowest serial number.

In some embodiments, the valid first uplink transmission characteristic of the first signal is not obtained includes at least one of: the UE has not received the configuration information of the first uplink transmission characteristic of the first signal; the UE has received the configuration information of the first uplink transmission characteristic of the first signal, but the UE has not received activation information corresponding to the configuration information; the UE has received the configuration information of the first uplink transmission characteristic of the first signal and the activation information corresponding to the configuration information, but the first uplink transmission characteristic of the first signal is not valid yet; the UE has received reconfiguration information of the first uplink transmission characteristic of the first signal, but the UE has not received the activation information corresponding to the reconfiguration information; the UE has received the reconfiguration information of the first uplink transmission characteristic of the first signal and the activation information corresponding to the reconfiguration information, but the first uplink transmission characteristic information of the first signal corresponding to the activation information is not valid yet; and the UE has received reactivation information of the first uplink transmission characteristic, but the first uplink transmission characteristic of the first signal corresponding to the reactivation information is not valid yet.

In some embodiments, the first uplink transmission characteristic is an uplink transmission beam.

In a fourth aspect, a network side device includes a second processor and a second transceiver, wherein the second transceiver is configured to send first indication information to a user equipment (UE), wherein the first indication information is used to instruct the UE to send a first signal; the second transceiver is further configured to determine a receiving mode corresponding to actual first uplink transmission characteristic of the first signal when valid first uplink transmission characteristic of the first signal is not sent to the UE, and receive the first signal by the receiving mode, or not receive the first signal on a resource scheduled for the first signal when valid first uplink transmission characteristic of the first signal is not sent to the UE.

In some embodiments, the second transceiver is also used for at least one of: sending second indication information to the UE, wherein the second indication information is used to indicate whether the UE performs the transmission of the first signal under the first uplink transmission characteristic; or sending third indication information to the UE, wherein the third indication information is used to instruct the UE to use the first uplink transmission characteristic to transmit the first signal; or sending fourth indication information to the UE, wherein the fourth indication information is used to instruct the UE to no longer use the first uplink transmission characteristic to perform the transmission of the first signal.

In some embodiments, the second transceiver is further configured to obtain indication information of the actual first uplink transmission characteristic of the first signal from another received first signal; or obtain the indication information of the actual first uplink transmission characteristic of the first signal from the received first signal.

In some embodiments, the indication information of the actual first uplink transmission characteristic includes: indication information for indicating one or more channel state information reference signal (CSI-RS) resource from a plurality of CSI-RS resources configured by the network side device for the UE for beam management, wherein the plurality of CSI-RS resources for beam management comprises at least one of CSI-RS resources for uplink beam management and CSI-RS resources for downlink beam management; or indication information for indicating one or more CSI-RS resource from a plurality of CSI-RS resources configured by the network side device for the UE for downlink CSI acquisition; or indication information for indicating one or more downlink demodulation reference signal (DMSR) ports from downlink DMRS ports configured by the network side device for the UE; or indication information for indicating one SRS resource from the SRS resources configured by the network side device for the UE.

In some embodiments, the actual first uplink transmission characteristic of the first signal refers to any one of: valid first uplink transmission characteristic sent most recently among all valid first uplink transmission characteristics sent to the UE; valid first uplink transmission characteristic sent most recently among all valid first uplink transmission characteristics of the first signal sent to the UE; first uplink transmission characteristic used most recently among all the first uplink transmission characteristics used by the UE; first uplink transmission characteristic used most recently among all the first uplink transmission characteristics used by the UE to send the first signal; and default first uplink transmission characteristic.

In some embodiments, when the actual first uplink transmission characteristic of the first signal is the valid first uplink transmission characteristic sent most recently among all the valid first uplink transmission characteristics sent to the UE, the valid first uplink transmission characteristic sent most recently refers to: one pre-defined first uplink transmission characteristics among the N first uplink transmission characteristics configured by radio resource control (RRC) most recently, and N is greater than or equal to 1; or when the actual first uplink transmission characteristic of the first signal is the valid first uplink transmission characteristic sent most recently among all the valid first uplink transmission characteristics of the first signal sent to the UE, the valid first uplink transmission characteristic sent most recently refers to: one predefined first uplink transmission characteristics among the N first uplink transmission characteristics corresponding to the first signal configured by RRC most recently, N is greater than or equal to 1; or, the valid first uplink transmission characteristic sent most recently refers to: the first uplink transmission characteristic activated by media access control layer control unit (MAC-CE) most recently.

In some embodiments, the default uplink transmission characteristic refers to any one of: the first uplink transmission characteristic used for the transmission of a third message Msg3 in a most recent random access channel (RACH) process; one pre-defined first uplink transmission characteristics among the N first uplink transmission characteristics configured by RRC most recently, N is greater than or equal to 1; and the first uplink transmission characteristic activated by MAC-CE most recently.

In some embodiments, the predefined first uplink transmission characteristic refers to the first uplink transmission characteristic with a lowest serial number.

In some embodiments, the valid first uplink transmission characteristic of the first signal is not sent to the UE includes at least one of: not sending configuration information of the first uplink transmission characteristic of the first signal to the UE; sending configuration information of the first uplink transmission characteristic of the first signal to the UE, but not sending activation information corresponding to the configuration information to the UE; sending the configuration information of the first uplink transmission characteristic of the first signal and the activation information corresponding to the configuration information to the UE, but the first uplink transmission characteristic of the first signal is not valid; sending reconfiguration information of the first uplink transmission characteristic of the first signal to the UE, but not sending the activation information corresponding to the reconfiguration information to the UE; sending the reconfiguration information of the first uplink transmission characteristic of the first signal and the activation information corresponding to the reconfiguration information to the UE, but the first uplink transmission characteristic information of the first signal corresponding to the activation information is not valid; sending reactivation information of the first uplink transmission characteristic to the UE, but the first uplink transmission characteristic of the first signal corresponding to the reactivation information is not valid.

In some embodiments, the first uplink transmission characteristic is an uplink transmission beam.

In a fifth aspect a UE includes: a processor, a memory, and a program stored on the memory and running on the processor, wherein the program is executed by the processor to implement the steps of the data transmission method.

In a sixth aspect, a network side device, including: a processor, a memory, and a program stored on the memory and running on the processor, wherein the program is executed by the processor to implement the steps of data transmission method.

In a seventh aspect, a computer readable storage medium, wherein a program is stored on the computer readable storage medium, and the program is executed by a processor to implement the steps of the data transmission method.

The first indication information sent by a network side device is received, the first indication information is used to instruct the UE to send a first signal; and actual first uplink transmission characteristic of the first signal is determined when valid first uplink transmission characteristic of the first signal is not obtained, and the first signal is sent through the actual first uplink transmission characteristic, or the first signal is not sent when valid first uplink transmission characteristic of the first signal is not obtained. It may be avoid the problem that when the indication of the uplink transmission characteristics is ambiguous, the UE arbitrarily determines the uplink transmission characteristics during, it may cause the understanding of the network side device and the UE are not consistent, the corresponding reception cannot be implemented, thereby affecting system performance.

BRIEF DESCRIPTION OF THE DRAWINGS

By reading the detailed description of the following alternative embodiments, various other advantages and benefits will become clear to those of ordinary skill in the art. The drawings are only used for the purpose of showing alternative embodiments, and are not considered as a limitation to the present disclosure. Also, throughout the drawings, the same reference symbols are used to denote the same components. In the attached picture.

DETAILED DESCRIPTION

Figure 1:
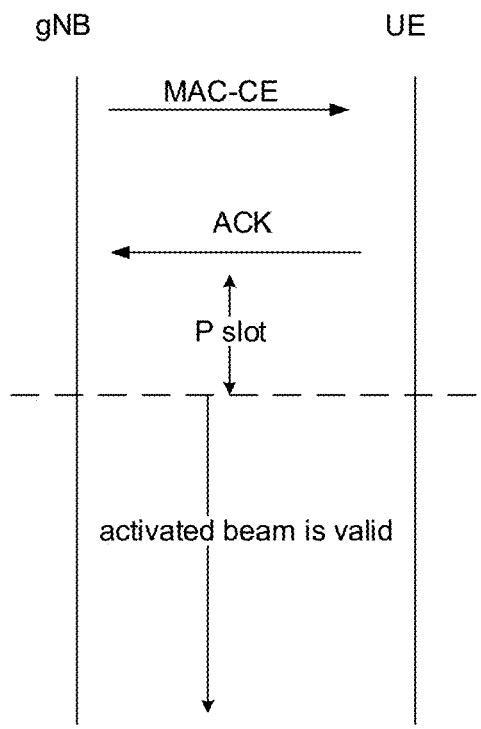
FIG. 1 is a schematic diagram of an activation process in a related art.

The technical solutions in the embodiments of the present disclosure will be described clearly and completely with reference to the accompanying drawings in the embodiments of the present disclosure. Obviously, the described embodiments are part of the embodiments of the present disclosure, not all of the embodiments. Based on the embodiments in the present disclosure, all other embodiments obtained by those of ordinary skill in the art without creative work shall fall within the protection scope of the present disclosure.

The term "comprising" and any variations of it in the specification and claims of the present disclosure are intended to cover non-exclusive inclusion. For example, a process, method, system, product, or device that includes a series of steps or units is not necessarily limited to clear those steps or units listed below may include other steps or units that are not clearly listed or are inherent to these processes, methods, products, or equipment. In addition, the use of "and/or" in the specification and claims means at least one of the connected objects, such as A and/or B, which means that it includes A alone, B alone, and there are three cases for both A and B.

In the embodiments of the present disclosure, words such as "exemplary" or "for example" are used as examples, illustrations, or illustrations. Any embodiment or design solution described as "exemplary" or "for example" in the embodiments of the present disclosure should not be construed as being more preferable or advantageous than other embodiments or design solutions. To be precise, words such as "exemplary" or "for example" are used to present related concepts in a specific manner.

In order to better understand the technical solutions of the embodiments of the present disclosure, first introduce the following technical points:

(1) A wireless transmitter with a plurality of antennas (for example: next generation node base station (gNB)) can form a narrower wireless signal pointing in a specific direction (for example: beamforming). The width and direction of the beam can be flexibly adjusted by applying appropriate weights to each antenna unit. Beamforming can be digital or analog.

For digital beamforming, each antenna unit has a separate baseband module, and each antenna unit can independently control the amplitude and phase of the signal transmitted on it. Therefore, the digital beam can be narrowband (for example: The narrower system bandwidth). Different digital beams can be multiplexed in the time or frequency domain. For analog beamforming, a plurality of antenna units share the same digital baseband module, and each antenna unit has an independent phase shifter. The signal sent by each antenna unit can only be adjusted in the transmission phase shift (amplitude adjustment is not possible). Therefore, the analog beam is broadband and can only be multiplexed in the time domain.

For analog beamforming, it can be applied to base stations in wireless communication systems and can also be used for UEs. For the uplink transmission from the UE to the base station, the analog beamforming of the uplink transmission can be obtained by the base station or the UE.

The first way: if the correspondence between the downlink (DL)/uplink (UL) beams on the UE side is established (for example, the reciprocity of the uplink and downlink beams is established), the UE can follow DL Rx beam (downlink reception beam) introduces its optimal UL Tx beam (uplink transmission beam, also known as uplink transmission characteristics), and the UE can automatically obtain the optimal UL Tx beam. In order for the UE to deduce the UL Tx beam, the UE needs to know the downlink signal used to estimate the DL Rx beam. This (or these) downlink signals may be pre-configured by higher-layer signals or indicated to the UE by the network side. Examples of some such downlink signals are: Channel State Information-Reference Signal (CSI-RS) and Synchronization Signal Block (SSB) in the 5G system.

The second way: if the DL/UL beam correspondence relationship on the UE side is not established, the UE cannot obtain the UL Tx beam through the DL signal, and the gNB is required to measure and select the UL signal. For example, the UE can send a set of uplink reference signals, and different uplink reference signals are sent using different UL Tx beams, which enables the gNB to use these uplink reference signals to perform uplink measurements and select the optimal transmission beam. Note that this method is applicable regardless of whether the corresponding relationship between the uplink and downlink beams of the UE is established. The gNB needs to first semi-statically configure or dynamically trigger a set of reference signals (RSs) resources sent by the UE. After receiving these RSs sent by the UE, the gNB sends a RS resource indication of its preference (for example: RS resource serial number) to the UE. In this way, the UE can use the transmission beam which is preferred by the UE and indicated by the gNB to ensure transmission performance. An example of a UL signal is the Sounding Reference Signal (SRS) in the 5G system.

Both of the above ways can be applied independently or simultaneously. The base station (gNB is taken as an example below) can indicate its preferred RS resource through an indication message.

In the embodiment of the present disclosure, the indication information used by the gNB to indicate its preferred RS resource may be explained by taking a sounding reference resource indicator (SRI) as an example. It should be noted that although in the embodiments of the present disclosure, SRI is taken as an example for illustration, no matter what name of the indication information, it is within the scope of the present disclosure. For example, the indication information may be an indication used to point to other types of RS resources (for example: DL reference signal or UL reference signal, CSI-RS, SSB, etc.). The gNB and the UE need to know the bit width of the SRI and the RS resource corresponding to each SRI indication state in advance. Each SRI may correspondingly indicate one RS resource or a group of RS resources.

It should be noted that the SRI used to indicate the UL Tx beam can be used for UL signals (for example: SRS), and also for uplink channels (for example, Physical Uplink Shared Channel (PUSCH), Physical Uplink Control Channel (PUCCH) and so on).

(2) Introduction to SRS:

SRS resources configured for a UE can be divided into a plurality of types from the perspective of time domain transmission behavior. For periodic SRS (P-SRS) and semi-persistent SRS (SP-SRS), they are transmitted in time domain according to a certain periodic pattern. A time pattern contains a specific period and a specific time offset. For aperiodic SRS (hereinafter referred to as AP-SRS or A-SRS), it can be dynamically triggered at any time through a dynamic signal instead of following a specific periodic transmission pattern. One trigger signaling can trigger SRS transmission at one time point or a plurality of time points within a specific time window. The trigger signaling may be carried in Downlink Control Information (DCI) used in uplink grant (UL grant) or downlink grant (DL grant).

SRS can be used for different purposes. A first type of SRS can be used for gNB to obtain UL Channel State Information (CSI). The SRS used for CSI acquisition can be performed with or without analog beamforming. If there is no analog beamforming, beam indication can be performed through the SRI described above. A second type of SRS can be used for simulating beam training, where a plurality of SRSs sent by the UE use the same or different beams. Similarly, the UL Tx beam can be indicated by the gNB through SRI.

The UL transmission beam of one (target) SRS resource can be provided by the indication of another (source) SRS resource, and the UE can assume that the target SRS resource uses the same UL Tx beam as the source SRS resource. Here are some examples of possible [source, target] SRS.

The source SRS resource can be configured and/or activated/deactivated through radio resource control (RRC) and/or medium access control control element (MAC-CE) signaling.

[P/SP, AP]: The source SRS resource of an AP-SRS can be configured through high-layer signaling, or dynamically triggered by a grant (or DCI) for AP SRS triggering.

[AP, AP]: The source SRS resource of an AP-SRS can be configured through high-layer signaling, or dynamically triggered through grant (or DCI signaling) for AP SRS triggering.

[AP, P/SP]: The UL Tx beam of the target SRS can dynamically change based on the dynamic trigger of the source AP-SRS. The relationship between the AP-SRS transmission time (for example: slot n1) and the starting time when the AP-SRS transmission beam is applied to the target SRS resource (for example: slot n2) needs to be defined in advance. For example: fixed, or through the configuration message of the high-layer signaling of the target SRS and/or source SRS, or through a dynamic indication (it can be an independent signal, or the same signal as the dynamic signal that triggers the AP-SRS).

One SRS resource set may include one or more SRS resources. SRS in 5G can be used for many purposes, such as UL CSI acquisition (digital beamforming), and/or UL transmission beam management (analog beamforming).

The SRS used for UL CSI acquisition (digital beamforming) can be transmitted with or without analog beamforming. The UL Tx beam of SRS can be determined based on any of the methods described above.

The SRS used for UL beam management (analog beamforming) can be used for different purposes, such as P2 and P3, where P2 represents Rx beam scanning of gNB, which requires the UE to use the same UL Tx beam to send a plurality of SRS resources (for example: one SRS resource set). The UL Tx beam is determined by the UE, or the UL Tx beam is determined by the gNB and indicated to the UE through signaling. P3 represents Tx beam scanning on the UE side, which requires the UE to use different UL Tx beams to transmit a plurality of SRS resources (for example, one SRS resource set). The UL Tx beam can be determined by the UE or indicated by the gNB.

(3) About PUSCH:

The transmission of PUSCH is scheduled by the base station. Therefore, the uplink transmission characteristics of the PUSCH can be dynamically indicated by SRI. SRI can be used for indication along with PUSCH scheduling, that is, each PUSCH transmission is always accompanied by a corresponding SRI beam indication. SRI can used for indication in the same UL grant that triggers the PUSCH, or it can be indicated by another L1 signal. As an implementation, one beam indication is used for the UE to transmit a plurality of PUSCHs, for example, to transmit in a plurality of slots. In this case, the L1 signal carrying SRI may need to indicate positions of a plurality of PUSCHs (for example: indicating slot number, starting position, duration of each valid SRI, or valid time of activation/deactivation information of an SRI).

(4) About PUCCH:

PUCCH can be used to transmit uplink control information, including but not limited to: ACK/NAK response for downlink data transmission, DL channel state information (CSI), and DL beam measurement results.

One UE can be configured with one or more PUCCH resources. Each PUCCH resource is a configuration of a group of time-frequency resources and some other possible parameters, such as a PUCCH format and a sequence. The uplink transmission beam of one PUCCH signal can be dynamically indicated or semi-statically configured. When one PUCCH signal is semi-statically configured, the Tx beam of a specific PUCCH resource is semi-statically configured by the base station. One way is to configure a group of transmission beams including N candidate transmission beams for each PUCCH resource through the RRC signal, where N≥1. If N=1, the beam configured for PUCCH through the RRC signal does not need to be further activated or deactivated, and can be directly used for PUCCH. If N≥1, an additional DL control signal (such as MAC-CE information or dynamic signal) can be used to select one transmission beam for PUCCH from the N beams configured by the RRC signal. After receiving the MAC-CE (the MAC-CE is carried by the PDSCH), the UE sends an acknowledgement (ACK) to the base station to confirm that the MAC-CE activation information is correctly received. After the base station receives the ACK information, there is a preset time interval of P slots. Both the base station and the UE assume that the active beam carried by the MAC-CE is currently valid, and start to use the active beam for communication. The deactivation process is similar to the above activation process. A schematic diagram of this process is shown in FIG. 1.

Figure 2:
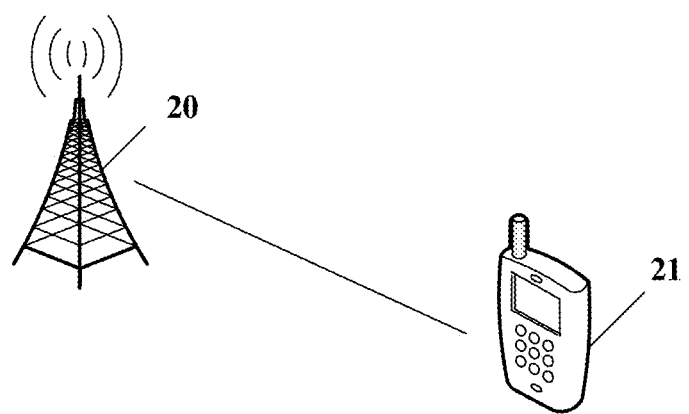
FIG. 2 is a schematic diagram of the architecture of a wireless communication system according to an embodiment of the disclosure.

The embodiments of the present disclosure are described below in conjunction with the drawings. The data transmission method and device provided in the embodiments of the present disclosure can be applied to a wireless communication system. The wireless communication system may be a 5G system, or an evolved long term evolution (eLTE) system, or an advanced evolved communication system. Refer to FIG. 2, which is a schematic diagram of the architecture of a wireless communication system provided by an embodiment of the present disclosure. As shown in FIG. 2, the wireless communication system may include: a network side device 20 and a UE, for example, UE 21, and the UE 21 can communicate with the network side device 20. In practical applications, the connection between the above-mentioned various devices may be a wireless connection. In order to conveniently and intuitively indicate the connection relationship among the various devices, a solid line is used in FIG. 2.

It should be noted that the above-mentioned communication system may include a plurality of UEs, and the network side device may communicate with the plurality of UEs (transmitting signaling or data).

The network side device provided in the embodiments of the present disclosure may be a base station, the network side device may be a commonly used base station, an evolved node base station (eNB), or a network side device in a 5G system (For example, gNB or a transmission and reception point (TRP)).

The UE provided by the embodiments of the present disclosure may be a mobile phone, a tablet computer, a notebook computer, an ultra-mobile personal computer (UMPC), a netbook, or a personal digital assistant (PDA), etc.

The beam in the embodiment of the present disclosure may be an analog beam, a digital beam, or an analog/digital hybrid beam, and may also correspond to precoding, analog precoding, digital precoding, and the like.

Figure 3:
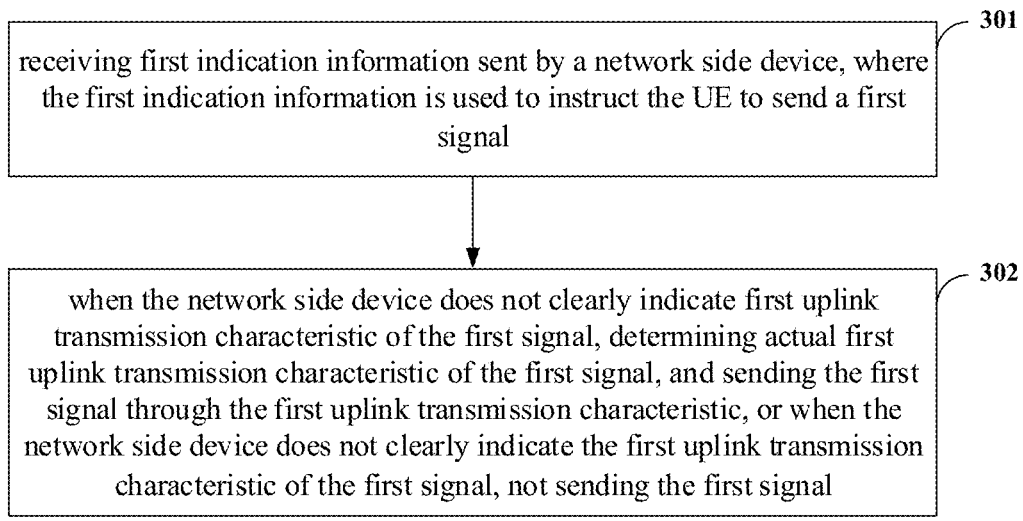
FIG. 3 is one of the flowcharts of the data transmission method according to the embodiment of the disclosure.

Referring to FIG. 3, which shows a flowchart of a data transmission method according to an embodiment of the present disclosure. The data transmission method is executed by the UE, and specifically includes steps 301 to 302.

Step 301: receiving first indication information sent by a network side device, where the first indication information is used to instruct the UE to send a first signal.

In the embodiment of the present disclosure, the first signal may be a Physical Uplink Shared Channel (PUSCH), a Physical Uplink Control Channel (PUCCH), a sounding reference signal (SRS), a random Access channel (RACH) or other types of signals.

In the embodiments of the present disclosure, the uplink transmission characteristic refers to a transmission format used by the UE. Although the uplink transmission beam is used as an example of the uplink transmission characteristics in this disclosure, it should be noted that other transmission characteristics (different from the UL beam, or as a supplement to the UL beam, such as the uplink transmission scheme) also applies. For ease of description, there is no explanation for other transmission characteristics.

Step 302: when the network side device does not clearly indicate first uplink transmission characteristic of the first signal, determining actual first uplink transmission characteristic of the first signal, and sending the first signal through the first uplink transmission characteristic, or when the network side device does not clearly indicate the first uplink transmission characteristic of the first signal, not sending the first signal.

In the embodiment of the present disclosure, optionally, the method further includes: determining whether the network side device clearly indicates the first uplink transmission characteristic of the first signal. Specifically, it is determined whether to send the first signal by using the first uplink transmission characteristic; when sending the first signal by using the first uplink transmission characteristic, it is determined whether the network side device clearly indicates the first uplink transmission characteristic of the first signal.

In the embodiment of the present disclosure, optionally, whether to send the first signal by using the first uplink transmission characteristic can be determined in the following modes.

Mode 1: second indication information related to the first uplink transmission characteristic is received from the network side device, where the second indication information is used to indicate whether the UE performs the transmission of the first signal under the first uplink transmission characteristic, and it is determined whether to perform the transmission of the first signal under the first uplink transmission characteristic based on the second indication information.

Mode 2: it is determined whether third indication information sent by the network side device is received, and it is determined whether to transmit the first signal by using the first uplink transmission characteristic based on whether the third indication information sent by the network side device is received.

If the third indication information is received, it is considered that the first uplink transmission characteristic needs to be used for the transmission of the first signal, otherwise the first uplink transmission characteristic is not used for the transmission of the first signal.

As an embodiment, specifically, the second indication information may be an explicit indication information. For example, the second indication information includes two states, and the two states respectively represent using the first uplink transmission characteristic to transmit the first signal and not using the first uplink transmission characteristic to transmit the first signal.

| second indication information | meaning |
| --- | --- |
| 0 | using the first uplink transmission characteristic to transmit the first signal |
| 1 | not using the first uplink transmission characteristic to transmit the first signal |

Of course, the second indication information may also include a plurality of states, some of which correspond to whether the first uplink transmission characteristic is used to transmit the first signal.

As another embodiment, specifically, the second indication information may be an implicit indication information, for example, the signal indication information associated with the first uplink transmission characteristic. For example, the network side device indicates the first uplink transmission characteristic corresponding to the first signal by indicating the second signal associated with the first signal to the UE. The uplink transmission characteristic corresponding to the first signal is determined by the second signal. For example, it is assumed that the first uplink transmission characteristic is an uplink transmission beam, the first signal is an SRS signal, the second signal is a CSI-RS signal, and the second indication information is related to the first signal and used to indicate the second signal. If the CSI-RS associated with the SRS is a CSI-RS to which beamforming is implemented, it is considered that the network side device instructs the UE to use the first uplink transmission characteristic to transmit the first signal. If the CSI-RS associated with the SRS is a CSI-RS to which the beamforming is not implemented, it is considered that the network side device indicates to the UE not to use the first uplink transmission characteristic to transmit the first signal.

As an embodiment, specifically, the third indication information may be a third signal associated with the first signal. If the network side device indicates the third signal for the UE, the UE considers that the network side device instructs the UE to use the first uplink transmission characteristic to transmit the first signal. If the UE does not obtain the third signal, it is considered that the network side device does not instruct the UE to use the first uplink transmission characteristic to transmit the first signal.

Mode 3: if the fourth indication information that the first uplink transmission characteristic is no longer used for the transmission of the first signal is not received, the first uplink transmission characteristic is used for the transmission of the first signal; otherwise, the first uplink transmission characteristic is not used for the transmission of the first signal.

Similar to the third indication information, the fourth indication information may also be an explicit indication or an implicit indication.

In the embodiment of the present disclosure, the actual first uplink transmission characteristic of the first signal can be determined in the following modes:

Mode 1: determining the first uplink transmission characteristic of the first signal based on the downlink receiving signal; or, Mode 2: determining that the actual first uplink transmission characteristic of the first signal is the same as the first uplink transmission characteristic of the third signal.

For Mode 1, optionally, the downlink signal is a CSI-RS signal. The first uplink transmission characteristic of the first signal is determined based on the CSI-RS signal configured by the network device for the UE. The CSI-RS signal may be a CSI-RS signal used for beam management, or a CSI-RS used for determining the first uplink transmission characteristic, or a CSI-RS used for acquiring downlink CSI, or the like. Taking the first uplink transmission characteristic as the uplink transmission beam as an example, the UE can obtain an uplink transmission beam through the downlink reception beam of CSI-RS, and the uplink transmission beam can be used as the uplink transmission beam of the first signal.

For Mode 1, optionally, the downlink signal may be a DMRS signal.

For Mode 2, the network device may indicate a third signal associated with the first signal for the UE, and the UE obtains the first uplink transmission of the first signal based on the third signal associated with the first signal. The third signal may be an uplink signal or a downlink signal.

In the embodiment of the present disclosure, after the determining the actual first uplink transmission characteristic of the first signal, the method further includes: sending indication information of the actual first uplink transmission characteristic to the network side device. For example, the indication information of the actual first uplink transmission characteristic is sent to the network side device through another first signal; or the indication information of the actual first uplink transmission characteristic is sent to the network side device through the first signal.

The other signal is not limited to the first signal, for example, the first signal is PUSCH, and the other signal is PUCCH. The other signal may also be a signal of another first signal type, for example, the first signal is one PUSCH, and the other signal is another PUSCH.

Further, the indication information of the actual first uplink transmission characteristic includes any one of the following:

Indication information for indicating one or more channel state information reference signal (CSI-RS) resource from a plurality of CSI-RS resources configured by the network side device for the UE for beam management;

Indication information for indicating one or more CSI-RS resource from a plurality of CSI-RS resources configured by the network side device for the UE for uplink beam management;

Indication information for indicating one or more CSI-RS resource from a plurality of CSI-RS resources configured by the network side device for the UE for downlink CSI acquisition;

Indication information for indicating one or more CSI-RS resource from a plurality of channel state information reference signals (CSI-RS) resources configured by the network side device for the UE for first uplink transmission characteristic acquisition;

Indication information for indicating one or more DMSR ports from the downlink DMRS ports configured by the network side device for the UE;

Indication information for indicating one SRS resource from the SRS resources configured by the network side device for the UE.

The UE determining the uplink transmission characteristics of the first signal includes but is not limited to the following modes.

The UE determines the uplink transmission characteristic of the first signal based on the downlink signal. Assuming that the uplink transmission characteristic is the uplink transmission beam, some specific modes are that the UE determines the uplink transmission beam of the first signal based on the CSI-RS received in the downlink, and uses the uplink transmission beam corresponding to the CSI-RS reception beam as the uplink transmission beam of the first signal. Correspondingly, the UL beam indication information corresponds to the CSI-RS indication information, and is used to indicate one CSI-RS resource from the candidate CSI-RS resources. The candidate CSI-RS resource is a CSI-RS resource configured for beam management, or the candidate CSI-RS resource is a CSI RS resource configured for UL CSI acquisition, or the candidate CSI-RS resource is a CSI-RS resource configured for uplink beam management, or the candidate CSI-RS resource is a CSI-RS resource configured for downlink CSI acquisition.

For another example, the UE determines the uplink transmission beam of the first signal based on the DMRS used for physical downlink shared channel (PDSCH) demodulation, and uses the uplink transmission beam corresponding to one or more DMRS port reception beams as the uplink transmission beam of the first signal. Correspondingly, the UL beam indication information corresponds to the DMRS indication information, and is used to indicate one DMRS port from the candidate DMRS ports. The candidate DMRS port is a DMRS port included in PUSCH transmission. Alternatively, the candidate DMRS port is the DMRS port corresponding to a default code word in PUSCH transmission. Specifically, the default code word may be the code word with the smallest number. For another example, the UE adopts a beam used for transmitting one or more SRS as the uplink transmission beam of the first signal. Correspondingly, the UL beam indication information corresponds to one SRS resource indication and is used to indicate one or more SRS resources.

In the embodiment of the present disclosure, optionally, the actual first uplink transmission characteristic of the first signal refers to any one of the following: the first uplink transmission characteristic clearly indicated by the network side device most recently; the first uplink transmission characteristic of the first signal clearly indicated by the network side device most recently; the first uplink transmission characteristic used by the UE most recently; the first uplink transmission characteristic used by the UE for transmitting the first signal most recently; and the default first uplink transmission characteristic.

In the embodiments of the present disclosure, optionally, the first uplink transmission characteristic clearly indicated most recently refers to any one of the following: one pre-defined first uplink transmission characteristics among the N first uplink transmission characteristics of uplink signal transmission configured by RRC most recently, N is greater than or equal to 1; and the first uplink transmission characteristic of the uplink signal transmission activated by MAC-CE most recently.

In the embodiments of the present disclosure, optionally, the first uplink transmission characteristic clearly indicated most recently refers to any one of the following: one predefined first uplink transmission characteristics among the N first uplink transmission characteristics corresponding to the first signal configured by RRC most recently, N is greater than or equal to 1; and the first uplink transmission characteristic of the first signal activated by MAC-CE most recently.

In the embodiment of the present disclosure, optionally, the first uplink transmission characteristic of the first signal clearly indicated most recently refers to any one of the following: one pre-defined first uplink transmission characteristics among the N first uplink transmission characteristics of the first signal transmission configured by RRC most recently, N is greater than or equal to 1; and the first uplink transmission characteristic of the first signal activated by MAC-CE most recently.

The first signal corresponds to a specific type of uplink signal, such as PUSCH, PUCCH, SRS, etc.

In the embodiment of the present disclosure, optionally, the first uplink transmission characteristic used by the UE for sending the first signal most recently refers to the first uplink transmission characteristic used in the transmission of the most recent first signal among the first signals sent by UE under the instruction of the network device before the network device instructs the UE to send the first signal. Optionally, the first signal corresponds to a specific type of uplink signal, such as PUSCH, PUCCH, SRS, etc.

In the embodiments of the present disclosure, optionally, the default first uplink transmission characteristic refers to any one of the following: the first uplink transmission characteristic used in the transmission of the third message Msg3 in the most recent random access channel (RACH) process; one pre-defined first uplink transmission characteristics among the N first uplink transmission characteristics configured by RRC most recently, N is greater than or equal to 1; and the first uplink transmission characteristic activated by MAC-CE most recently.

In the embodiment of the present disclosure, optionally, when N is greater than 1, the predefined first uplink transmission characteristic refers to: the first uplink transmission characteristics having the lowest serial number among the N first uplink transmission characteristics configured by RRC most recently; when N is equal to 1, the predefined first uplink transmission characteristic refers to: one first uplink transmission characteristic configured by RRC most recently.

In the embodiment of the present disclosure, whether the network side device clearly indicates the first uplink transmission characteristic of the first signal specifically refers to whether the UE obtains valid first uplink transmission characteristic of the first signal. Correspondingly, the network side device does not clearly indicate the first uplink transmission characteristic of the first signal specifically refers to that the UE has not obtained the valid first uplink transmission characteristic of the first signal. The first uplink transmission characteristic clearly indicated by the network side device may specifically refer to the valid first uplink transmission characteristic obtained by the UE.

In the embodiment of the present disclosure, optionally, the valid first uplink transmission characteristic of the first signal is not obtained includes at least one of the following.

The UE has not received the configuration information of the first uplink transmission characteristic of the first signal.

The UE has received the configuration information of the first uplink transmission characteristic of the first signal, but the UE does not receive the activation information corresponding to the configuration information.

The UE has received the configuration information of the first uplink transmission characteristic of the first signal and the activation information corresponding to the configuration information, but the first uplink transmission characteristic of the first signal is not valid yet.

The UE has received reconfiguration information of the first uplink transmission characteristic of the first signal, but the UE does not receive the activation information corresponding to the reconfiguration information.

The UE has received the reconfiguration information of the first uplink transmission characteristic of the first signal and the activation information corresponding to the reconfiguration information, but the first uplink transmission characteristic information of the first signal corresponding to the activation information is not valid yet.

The UE has received reactivation information of the first uplink transmission characteristic, but the first uplink transmission characteristic of the first signal corresponding to the reactivation information is not valid yet.

In the embodiment of the present disclosure, optionally, the valid first uplink transmission characteristic of the first signal is not obtained includes any one of the following.

The UE has not received initial RRC configuration including configuration information of the first uplink transmission characteristic.

The UE has received the initial RRC configuration including configuration information of the first uplink transmission characteristic, but has not received associated MAC-CE activation signaling.

The UE has received RRC reconfiguration information including the configuration information of the first uplink transmission characteristic, but has not yet received the associated MAC-CE activation information.

The UE has received RRC configuration including the configuration information of the first uplink transmission characteristic and the first MAC-CE activation information and second MAC-CE activation information or reactivation information associated with the RRC configuration, but the uplink transmission feature activated by the second MAC-CE activation information or reactivation information is not valid yet.

In the embodiments of the present disclosure, optionally, the actual first uplink transmission characteristic of the first signal refers to any one of the following: (i) the valid first uplink transmission characteristic obtained most recently among all valid first uplink transmission characteristics obtained by the UE; (ii) the valid first uplink transmission characteristic obtained most recently among all valid first uplink transmission characteristics of the first signals obtained by the UE; (iii) the first uplink transmission characteristic used most recently among all first uplink transmission characteristics used by the UE; (iv) the first uplink transmission characteristic used most recently among all first uplink transmission characteristics used by the UE for sending the first signal; and (v) the default first uplink transmission characteristic.

Some examples corresponding to the above situations are given below.

For the above case (i), the first signal is the PUSCH and the first uplink transmission characteristic is the uplink transmission beam.

In an example: the base station instructs the uplink transmission beam to the UE, the uplink transmission beams are used for all uplink signals. Only if the UE obtains the uplink transmission beam indicated by the base station, and after the uplink transmission beam is valid (the uplink transmission beam being valid may be related to the signaling method of the base station instructing the uplink transmission beam. For example, the base station configures the uplink transmission beam through RRC signaling, and when MAC-CE signaling is used for activation and the valid time is reached, the uplink transmission beam is considered valid. For another example, the base station instructs the uplink transmission beam through DCI signaling, and after the UE decodes the uplink transmission beam indicated by the DCI, the uplink transmission beam becomes valid. For another example, the base station instructs the uplink transmission beam to the UE, and when the valid time is reached, the uplink transmission beam is valid. Note that the indication method of the uplink transmission beam can be direct indication or indication through reference signal, etc.), the UE is considered to obtain the valid uplink transmission beam. If the UE receives the first indication information used for the base station to instructing the UE to send the PUSCH and sends the PUSCH corresponding to the first indication information, the base station does not send the indication information of the uplink transmission beam to the UE or the indication information or reconfiguration information of the uplink transmission beam sent by the base station is not valid yet, and it can be considered that the UE has not obtained a valid uplink transmission beam of the PUSCH corresponding to the first indication information. The valid first uplink transmission characteristic obtained most recently among all the valid first uplink transmission characteristics obtained by the UE refers to the first uplink transmission characteristic obtained most recently and being valid among the valid first uplink transmission characteristics obtained by the UE.

In another example: the base station indicates the uplink transmission beams of various uplink signals to the UE, for example, the uplink transmission beam indicating PUSCH and the uplink transmission beam of SRS. When the UE receives the first indication information to send the PUSCH and sends the PUSCH corresponding to the first indication information, if the base station does not send the indication information of the uplink transmission beam to the UE or the UE receives the indication information or reconfiguration information of the uplink transmission beam of the PUSCH sent by the base station, and the indication information or reconfiguration information is not valid yet, it is considered that the UE has not obtained a valid uplink transmission beam of the PUSCH corresponding to the first indication information. The valid first uplink transmission characteristic obtained most recently among all the valid first uplink transmission characteristics obtained by the UE refers to the valid first uplink transmission characteristics obtained most recently among valid uplink transmission beams of all uplink signals obtained by the UE. For example, if the valid uplink transmission beam obtained most recently is one uplink transmission beam of SRS, the UE uses the uplink transmission beam of SRS to transmit the PUSCH.

For the above case (ii), the first signal is the PUSCH and the first uplink transmission characteristic is the uplink transmission beam.

In an example: after the UE receives the first indication information that the base station instructs the UE to send the PUSCH, when the PUSCH corresponding to the first indication information is sent, if the base station does not send the indication information of the uplink transmission beam of the PUSCH to the UE or the configuration information or reconfiguration information of the uplink transmission beam of PUSCH sent by the base station is not valid yet, it is considered that the UE has not obtained a valid uplink transmission beam of the PUSCH corresponding to the first indication information. The valid first uplink transmission characteristic obtained most recently among all the valid first uplink transmission characteristics of the first signal obtained by the UE refers to the valid uplink transmission beam of the PUSCH obtained by the UE most recently.

For the above case (iii), the first signal is the PUSCH and the first uplink transmission characteristic is the uplink transmission beam.

In an example: after the UE receives the first indication information that the base station instructs the UE to send the PUSCH, when the PUSCH corresponding to the first indication information is sent, if the UE does not obtain a valid uplink transmission beam corresponding to the PUSCH, the uplink transmission beam used for the UE to send the uplink signal most recently is used.

For the above case (iv), the first signal is the PUSCH and the first uplink transmission characteristic is the uplink transmission beam.

In an example: after the UE receives the first indication information that the base station instructs the UE to send the PUSCH, when the PUSCH corresponding to the first indication information is sent, if the UE does not obtain a valid uplink transmission beam corresponding to the PUSCH, the uplink transmission beam used for the UE to send the PUSCH most recently is used.

In this way, the first indication information sent by the network side device is received, the first indication information is used to instruct the UE to send the first signal. When the network side device does not clearly indicate the first uplink transmission characteristic of the first signal, the actual first uplink transmission characteristic of the first signal is determined, and the first signal is sent through the first uplink transmission characteristic, or when the network side device does not clearly indicate the first uplink transmission characteristic of the first signal, the first signal is not sent to avoid that when the uplink transmission characteristic indication is not clear, the UE determines the uplink transmission characteristic by itself, which may cause inconsistent understanding between the network side device and the UE, and thus cannot use corresponding uplink receiving behaviors, thereby affecting system performance.

Figure 4:
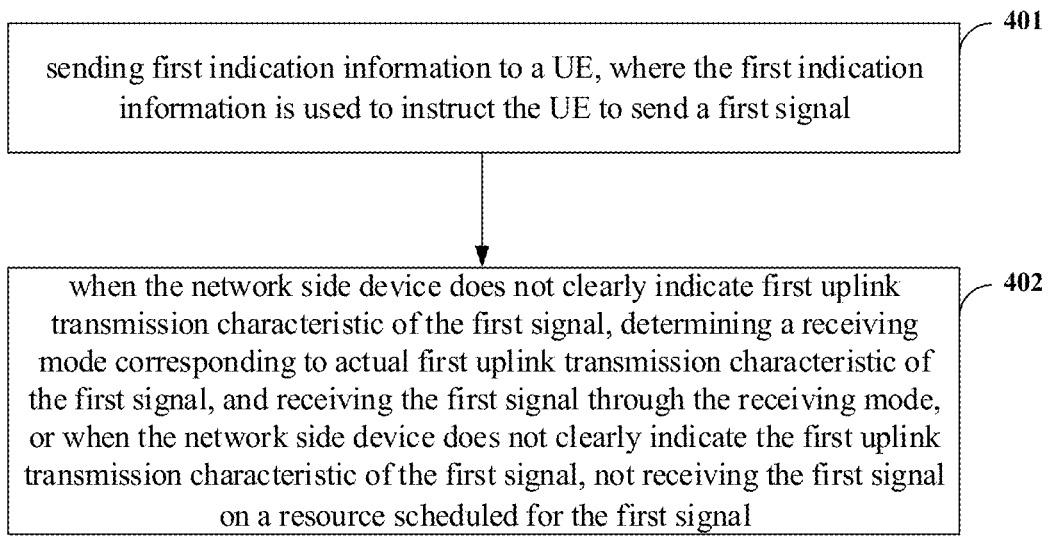
FIG. 4 is the second flowchart of the data transmission method according to an embodiment of the disclosure.

Referring to FIG. 4, which shows the flowchart of a data transmission method according to an embodiment of the present disclosure. The method is executed by a network side device, and the specific steps are as follows:

Step 401: sending first indication information to a UE, where the first indication information is used to instruct the UE to send a first signal.

Step 402: when the network side device does not clearly indicate first uplink transmission characteristic of the first signal, determining a receiving mode corresponding to actual first uplink transmission characteristic of the first signal, and receiving the first signal through the receiving mode, or when the network side device does not clearly indicate the first uplink transmission characteristic of the first signal, not receiving the first signal on a resource scheduled for the first signal.

In the embodiment of the present disclosure, optionally, the method further includes: sending indication information of whether to use the first uplink transmission characteristic to send the first signal to a UE.

Mode 1: sending second indication information about the first uplink transmission characteristic, where the second indication information is used to indicate whether the UE performs the transmission of the first signal under the first uplink transmission characteristic. The UE may determine whether to perform transmission of the first signal under the first uplink transmission characteristic according to the second indication information.

Mode 2: sending third indication information. If the UE has received the third indication information, the UE considers that it is necessary to use the first uplink transmission characteristic to transmit the first signal, otherwise the first uplink transmission characteristic is not used to transmit the first signal.

As an embodiment, specifically, the second indication information may be an explicit indication information. For example, the second indication information includes two states, and the two states respectively represent using the first uplink transmission characteristic to transmit the first signal and not using the first uplink transmission characteristic to transmit the first signal.

| second indication message | meaning |
|---|---|
| 0 | using the first uplink transmission characteristic to transmit the first signal |
| 1 | not using the first uplink transmission characteristic to transmit the first signal |

Of course, the second indication information may also include a plurality of states, some of which correspond to whether to use the first uplink transmission characteristic to transmit the first signal.

As another embodiment, specifically, the second indication information may be an implicit indication information. For example, the signal indication information associated with the first uplink transmission characteristic, for example, the network device indicates the first uplink transmission characteristic corresponding to the first signal by indicating the second signal associated with the first signal to the UE, the uplink transmission characteristic corresponding to the first signal is determined by the second signal. For example, suppose that the first uplink transmission characteristic is an uplink transmission beam, the first signal is an SRS signal, the second signal is a CSI-RS signal, and the second indication information is the indication of the second signal related to the first signal. If the CSI-RS associated with the SRS is a CSI-RS after beamforming, it is considered that the network device instructs the UE to use the first uplink transmission characteristic to transmit the first signal. If CSI-RS related to the SRS does not perform beamforming, it is considered that the network device instructs the UE not to use the first uplink transmission characteristic to transmit the first signal.

As an embodiment, specifically, the third indication information may be a third signal associated with the first signal. If the network device indicates the third signal for the UE, the UE considers that the network device instructs the UE to use the first uplink transmission characteristic to transmit the first signal. If the UE does not obtain the third signal, it is considered that the network device does not instruct the UE to use the first uplink transmission characteristic to transmit the first signal.

Mode 3: sending fourth indication information, where the fourth indication information is used to instruct the UE to no longer use the first uplink transmission characteristic to transmit the first signal. If the terminal does not receive the fourth indication information, the first uplink transmission characteristic is used to transmit the first signal; otherwise, the first uplink transmission characteristic is not used to transmit the first signal.

Similar to the second indication information and the third indication information, the fourth indication information may also be an explicit indication or an implicit indication.

In the embodiment of the present disclosure, optionally, the method further includes: obtaining indication information of actual first uplink transmission characteristic of the first signal sent by the UE. Optionally, the indication information of the actual first uplink transmission characteristic of the first signal sent by the terminal is directly carried by the first signal. Optionally, the indication information of the actual first uplink transmission characteristic of the first signal sent by the terminal is carried by another signal. When the first signal is the PUSCH, optionally, the other signals are PUCCH, SRS, etc. Optionally, the other signal is another first signal, for example, another PUSCH.

In the embodiment of the present disclosure, optionally, the method further includes: obtaining indication information of the actual first uplink transmission characteristic of the first signal sent by the UE.

For example: indication information of the actual first uplink transmission characteristic from other received first signals is obtained, or indication information of the actual first uplink transmission characteristic from the received first signal is obtained.

In the embodiment of the present disclosure, the indication information of the first uplink transmission characteristic includes: the indication information indicating one or more CSI-RS resources among the a plurality of CSI-RS resources configured by the network side device for the UE; or indication information indicating one or more CSI-RS resources among the plurality of CSI-RS resources used for uplink beam management configured by the network side device for the UE; or indication information indicating one or more CSI-RS resources among the a plurality of CSI-RS resources used for downlink CSI acquisition configured by the network side device for the UE; or indication information indicating one or more DMSR ports in the downlink demodulation reference signal (DMRS) ports configured by the network side device for the UE; or indication information indicating one channel detection SRS resource in the SRS resources configured by the network side device for the UE.

In the embodiment of the present disclosure, optionally, second indication information is sent to the UE, where the second indication information is used to indicate whether the UE performs the first signal transmission under the first uplink transmission characteristic; or send third indication information to the UE, where the third indication information is used to indicate the UE to use the first uplink transmission characteristic to transmit the first signal; or send fourth indication information to the UE, the fourth indication information is used to indicate the UE no to use the first uplink transmission characteristic to transmit the first signal any more.

In the embodiment of the present disclosure, if the second indication information is used to instruct the UE to transmit the first signal under the first uplink transmission characteristic, then the receiving mode corresponding to the first uplink transmission characteristic determined by the UE is adopted to accept the first signal.

In the embodiment of the present disclosure, optionally, the actual first uplink transmission characteristic of the first signal refers to any one of the following: the first uplink transmission characteristic clearly indicated by the network side device most recently; the first uplink transmission characteristic of the first signal clearly indicated by the network side device most recently; the first uplink transmission characteristic used by the UE most recently; the first uplink transmission characteristic used by the UE for transmitting the first signal most recently; and the default first uplink transmission characteristic.

In the embodiment of the present disclosure, optionally, the clearly indicated first uplink transmission characteristic most recently refers to any one of the following: one predefined first uplink transmission characteristic among the N first uplink transmission characteristics corresponding to the first signal configured by RRC most recently, N is greater than or equal to 1; or the first uplink transmission characteristic activated by MAC-CE most recently.

In the embodiment of the present disclosure, optionally, the first uplink transmission characteristic of the first signal clearly indicated most recently refers to any one of the following: one pre-defined first uplink transmission characteristics among the N first uplink transmission characteristics transmitted by the first signal configured by the RRC most recently, N is greater than or equal to 1; and the first uplink transmission characteristic of the first signal activated MAC-CE most recently.

The first signal corresponds to a specific type of uplink signal, such as PUSCH, PUCCH, SRS, etc.

In the embodiment of the present disclosure, optionally, the first uplink transmission characteristic used by the UE for sending the first signal most recently refers to the first uplink transmission characteristic used in the transmission of the most recent first signal among the first signals sent by UE under the instruction of the network device before the network device instructs the UE to send the first signal. Optionally, the first signal corresponds to a specific type of uplink signal, such as PUSCH, PUCCH, SRS, etc.

In the embodiments of the present disclosure, optionally, the default first uplink transmission characteristic refers to any one of the following: the first uplink transmission characteristic used in the transmission of the third message Msg3 in the most recent random access channel (RACH) process; one pre-defined first uplink transmission characteristics among the N first uplink transmission characteristics configured by RRC most recently, N is greater than or equal to 1; and the first uplink transmission characteristic activated by MAC-CE most recently.

In the embodiment of the present disclosure, optionally, when N is greater than 1, the predefined first uplink transmission characteristic refers to: the first uplink transmission characteristics having the lowest serial number among the N first uplink transmission characteristics configured by RRC most recently; when N is equal to 1, the predefined first uplink transmission characteristic refers to: one first uplink transmission characteristic configured by RRC most recently.

In the embodiment of the present disclosure, whether the network side device clearly indicates the first uplink transmission characteristic of the first signal specifically refers to whether the UE obtains valid first uplink transmission characteristic of the first signal. Correspondingly, the network side device does not clearly indicate the first uplink transmission characteristic of the first signal specifically refers to that the UE has not obtained the valid first uplink transmission characteristic of the first signal. The first uplink transmission characteristic clearly indicated by the network side device may specifically refer to the valid first uplink transmission characteristic obtained by the UE.

In the embodiment of the present disclosure, optionally, not sending the valid first uplink transmission characteristic of the first signal to the UE includes at least one of the following: not sending configuration information of the first uplink transmission characteristic of the first signal to the UE; sending configuration information of the first uplink transmission characteristic of the first signal to the UE, but not sending activation information corresponding to the configuration information to the UE; sending the configuration information of the first uplink transmission characteristic of the first signal and the activation information corresponding to the configuration information to the UE, but the first uplink transmission characteristic of the first signal being not valid; sending the reconfiguration information of the first uplink transmission characteristic of the first signal to the UE, but not sending the activation information corresponding to the reconfiguration information to the UE; sending the reconfiguration information of the first uplink transmission characteristic of the first signal and the activation information corresponding to the reconfiguration information to the UE, but the first uplink transmission characteristic information of the first signal corresponding to the activation information being not valid yet; sending the reactivation information of the first uplink transmission characteristic to the UE, but the first uplink transmission characteristic of the first signal corresponding to the reactivation information being not valid yet.

In the present disclosure, optionally, sending the configuration information of the first uplink transmission characteristic of the first signal to the UE may be implemented in any of the following: sending the configuration information of the first uplink transmission characteristic to the UE, the first uplink transmission characteristic being used for all uplink signals; or sending the configuration information of the first uplink transmission characteristic of the first signal to the UE; or sending the configuration information of the first uplink transmission characteristic of the first signal to the UE, and the first uplink transmission characteristic being used for all first signals.

In the embodiment of the present disclosure, optionally, not sending the valid first uplink transmission characteristic of the first signal to the UE includes at least one of the following: not sending initial RRC configuration including the first uplink transmission characteristic configuration information to the UE; sending the initial RRC configuration including the first uplink transmission characteristic configuration information to the UE, but not sending the associated MAC-CE activation signaling to the UE; sending RRC reconfiguration information including the configuration information of the first uplink transmission characteristic, but not sending the associated MAC-CE activation information to the UE; and sending the RRC configuration including the configuration information of the first uplink transmission characteristic, and the first MAC-CE activation information and the second MAC-CE activation information or reactivation information associated with the RRC configuration to the UE, but the uplink transmission feature activated by the second MAC-CE activation information or reactivation information being not valid yet.

In the embodiments of the present disclosure, optionally, the actual first uplink transmission characteristic of the first signal refers to any one of the following: (i) the valid first uplink transmission characteristic obtained most recently among all valid first uplink transmission characteristics sent to the UE; (ii) the valid first uplink transmission characteristic obtained most recently among all valid first uplink transmission characteristics of the first signals sent to the UE; (iii) the first uplink transmission characteristic used most recently among all first uplink transmission characteristics used by the UE; (iv) the first uplink transmission characteristic used most recently among all first uplink transmission characteristics used by the UE for sending the first signal; and (v) the default first uplink transmission characteristic.

Some examples corresponding to the above situations are given below.

For the above case (i), the first signal is the PUSCH and the first uplink transmission characteristic is the uplink transmission beam.

In an example: the base station instructs the uplink transmission beam to the UE, the uplink transmission beams are used for all uplink signals. Only if base station indicates the uplink transmission beam, and after the uplink transmission beam is valid (the uplink transmission beam being valid may be related to the signaling method of the base station instructing the uplink transmission beam. For example, the base station configures the uplink transmission beam through RRC signaling, and when MAC-CE signaling is used for activation and the valid time is reached, the uplink transmission beam is considered valid. For another example, the base station instructs the uplink transmission beam through DCI signaling, and after the UE decodes the uplink transmission beam indicated by the DCI, the uplink transmission beam becomes valid. For another example, the base station instructs the uplink transmission beam to the UE, and when the valid time is reached, the uplink transmission beam is valid. Note that the indication method of the uplink transmission beam can be direct indication or indication through reference signal, etc.), the base station sends the valid uplink transmission beam to the UE. If the UE receives the first indication information used for the base station to instruct the UE to send the PUSCH and sends the PUSCH corresponding to the first indication information, the base station does not send the indication information of the uplink transmission beam to the UE or the indication information or reconfiguration information of the uplink transmission beam sent by the base station is not valid yet, and it can be considered that the base station does not send a valid uplink transmission beam of the PUSCH corresponding to the first indication information to the UE. The valid first uplink transmission characteristic obtained most recently among all the valid first uplink transmission characteristics sent to the UE refers to the first uplink transmission characteristic sent by the base station to the UE most recently and being valid among the valid first uplink transmission characteristics sent by the base station to the UE.

In another example: the base station indicates the uplink transmission beams of various uplink signals to the UE, for example, the uplink transmission beam indicating PUSCH and the uplink transmission beam of SRS. When the UE receives the first indication information to send the PUSCH and sends the PUSCH corresponding to the first indication information, if the base station does not send the indication information of the uplink transmission beam of PUSCH to the UE or the indication information or reconfiguration information of the uplink transmission beam of the PUSCH sent by the base station to the UE is not valid yet, it is considered that the base station has not sent a valid uplink transmission beam of the PUSCH corresponding to the first indication information to the UE. The valid first uplink transmission characteristic sent most recently among all the valid first uplink transmission characteristics sent to the UE refers to the valid first uplink transmission characteristics sent most recently among valid uplink transmission beams of all uplink signals sent by the base station to the UE. For example, if the valid uplink transmission beam sent most recently is one uplink transmission beam of SRS, the UE uses the uplink transmission beam of SRS to transmit the PUSCH.

For the above case (ii), the first signal is the PUSCH and the first uplink transmission characteristic is the uplink transmission beam.

In an example: after the UE receives the first indication information that the base station instructs the UE to send the PUSCH, when the PUSCH corresponding to the first indication information is sent, if the base station does not send the indication information of the uplink transmission beam of the PUSCH to the UE or the configuration information or reconfiguration information of the uplink transmission beam of PUSCH sent by the base station is not valid yet, it is considered that the base station has not sent a valid uplink transmission beam of the PUSCH corresponding to the first indication information to the UE. The valid first uplink transmission characteristic sent most recently among all the valid first uplink transmission characteristics of the first signal sent by the base station to the UE refers to the valid uplink transmission beam of the PUSCH sent to the UE most recently.

For the above case (iii), the first signal is the PUSCH and the first uplink transmission characteristic is the uplink transmission beam.

In an example: after the UE receives the first indication information that the base station instructs the UE to send the PUSCH, when the PUSCH corresponding to the first indication information is sent, the uplink transmission beam used for the UE to send the uplink signal most recently is used.

For the above case (iv), the first signal is the PUSCH and the first uplink transmission characteristic is the uplink transmission beam.

In an example: after the UE receives the first indication information that the base station instructs the UE to send the PUSCH, when the PUSCH corresponding to the first indication information is sent, the uplink transmission beam used for the UE to send the PUSCH most recently is used.

In the embodiment of the present disclosure, the first signal may be a Physical Uplink Shared Channel (PUSCH), a Physical Uplink Control Channel (PUCCH), a sounding reference signal (Sounding Reference Signal, SRS), a random Access channel (Random Access Channel, RACH) or other types of signals.

In the embodiments of the present disclosure, the uplink transmission characteristic refers to a transmission format used by the UE. Although the uplink transmission beam is used as an example of the uplink transmission characteristics in the present disclosure, it should be noted that other transmission characteristics (different from the UL beam or as a supplement to the UL beam) are also applicable. For ease of description, there is no explanation for other transmission characteristics.

In the embodiment of the present disclosure, optionally, the receiving the first signal sent through the first uplink transmission characteristic includes: determining the actual uplink transmission beam of the uplink signal; and receiving the first signal sent through the first uplink transmission characteristic using receiving beams corresponding to the actual uplink transmission beam.

EXAMPLE 1

Step 1: for a first signal that is scheduled or triggered for transmission, the UE determines whether it is necessary to use an uplink transmission characteristic to implement beamforming on the first signal. If necessary, the UE determines whether the network clearly indicates the uplink transmission characteristics of the first signal.

Step 2: if the uplink transmission characteristics are not clearly indicated through the network, the UE does not transmit the first signal.

EXAMPLE 2

Step 1: for a first signal that is scheduled or triggered for transmission, the UE determines whether it is necessary to use an uplink transmission characteristic to implement beamforming on the first signal. If necessary, the UE determines whether the network clearly indicates the uplink transmission characteristics of the first signal.

Step 2: if the network does not clearly indicate the uplink transmission characteristics, the UE determines the uplink transmission characteristics of the first signal.

Optionally, the UE instructs the uplink transmission characteristic of the first signal determined by itself to the network side device. The instruction of the uplink transmission characteristic may be carried by another first signal, or by the first signal that is scheduled or triggered.

EXAMPLE 3

Step 1: for a first signal that is scheduled or triggered for transmission, the UE determines whether it is necessary to use an uplink transmission characteristic to implement beamforming on the first signal. If necessary, the UE determines whether the network clearly indicates the uplink transmission characteristics of the first signal.

Step 2: if the network does not clearly indicate the uplink transmission characteristics, the UE uses the uplink transmission characteristics clearly indicated by the network most recently as the uplink transmission characteristics.

The uplink transmission characteristic may be: one predefined beam among the N beams configured by RRC most recently. For example, if N>1, the predefined beam is the beam having the lowest serial number among the N beams; if N=1, the predefined beam are N beams configured by RRC most recently.

Or, the uplink transmission characteristic may be the beam activated by MAC-CE most recently.

EXAMPLE 4

Step 1: for a first signal that is scheduled or triggered for transmission, the UE determines whether it is necessary to use an uplink transmission characteristic to implement beamforming on the first signal. If necessary, the UE determines whether the network clearly indicates the uplink transmission characteristics of the first signal.

Step 2: if the network does not clearly indicate the uplink transmission characteristics, the UE uses a default uplink transmission characteristic.

Optionally, the default uplink transmission characteristic is any one of the following: uplink transmission characteristics used in Msg3 transmission during the most recent RACH process; one predefined beam among the N beams configured by RRC most recently, for example: if N>1, the predefined beam is the beam with the lowest serial number among the N beams; if N=1, the predefined beam are N beams configured by RRC most recently; and beam activated by MAC-CE most recently.

Optionally, the default uplink transmission characteristics may be predefined by the network.

For the first signal of the spatial beam configured by the gNB, there is an ambiguity period with unclear uplink transmission characteristics for the UE, including but not limited to the following scenarios.

Scenario 1: The UE has not received the initial RRC configuration on the beam.

After the UE is powered on, the UE searches for a downlink synchronization channel and reads the physical broadcast channel (PBCH) to obtain necessary system information for initial access to connect to a cell. When the UE needs to access the searched cell through the uplink, the initial access procedure (RACH) is started. The initial access process includes a first message from the UE to the gNB (Msg1, uplink information used for timing estimation), a second message from the gNB to the UE (Msg2, scheduling permission information carrying the third message (Msg3)), and the Msg3 from the UE to the gNB (carrying various information requested by the UE, including RRC connection request information), and a fourth message from the gNB to the UE (Msg4, carrying the confirmation information of msg3). Msg4 may carry contention resolution and the initial RRC configuration information sent to the UE.

If the UE has successfully received Msg4, the initial access is successfully performed. It should be noted that the RRC configuration information in Msg4 may not include all the RRC parameters of the UE, but only a part of the RRC parameters. Additional RRC parameters (such as uplink transmission characteristics) may be transmitted at a time point in the future. Therefore, in the time period between the reception of Msg4 and the future transmission of RRC information carrying uplink transmission characteristic information, the UE does not know what kind of uplink transmission characteristics should be used (that is, there is an ambiguity period of uplink transmission characteristics).

It should be noted that even if the uplink transmission characteristics are carried in Msg4, the uplink transmission characteristics used for uplink transmission are still unclear to the UE before the uplink transmission characteristics is valid (for example: activated by MAC-CE), unless (1) the sending and receiving delay of the configuration information of the uplink transmission characteristic of RRC is clearly defined, and (2) the time interval for applying the configured uplink transmission characteristic to uplink transmission is clearly defined, and the UE does not implement any UL transmission from configuring the uplink transmission characteristic to (2). Otherwise, the problem of unclear transmission beams still exists.

Scenario 2: the UE has received the initial RRC configuration on the beam, but has not yet received the associated MAC-CE activation signaling.

RRC carries a set of N configured beams, where N≥1. If N>1, there will be one MAC-CE activation information used to select one beam from N configured beams for uplink transmission. Before the beam indicated by the MAC-CE activation information is valid, it is ambiguous for the UE which uplink transmission characteristics should be used, unless the problem of ambiguous uplink transmission characteristics is solved, the UE is not forced to perform any uplink transmission. However, this is not always guaranteed. For example: the periodic PUCCH used for periodic channel state information (CSI) reporting must be transmitted at the time point after the RRC configuration of the PUCCH resource, which may be before the MAC-CE activates the UL beam, which will cause the ambiguous uplink transmission characteristics.

Scenario 3: after receiving an RRC reconfiguration message and before receiving the associated MAC-CE activation message.

Scenario 4: after receiving the RRC configuration and the associated first MAC-CE activation information, the UE uses the activation beam indicated by the first MAC-CE, and then the UE receives the second MAC-CE activation (or reactivation) information, but the beam activated by the second MAC-CE is not valid yet.

Specifically: after receiving the RRC configuration and MAC-CE activation information (first MAC-CE), the indicated activation beam (referred to as the first beam) is used for uplink transmission. At any time point, the gNB may deactivate the current beam (first beam) and activate another beam (called the second beam) through another MAC-CE (second MAC-CE). The deactivation instruction of the first beam and the activation instruction of the second beam may be in the same MAC-CE, or different MAC-CEs. In any case, before the beam (the second beam) activated by the second MAC-CE is valid, the uplink transmission characteristics is ambiguous.

Figure 5:
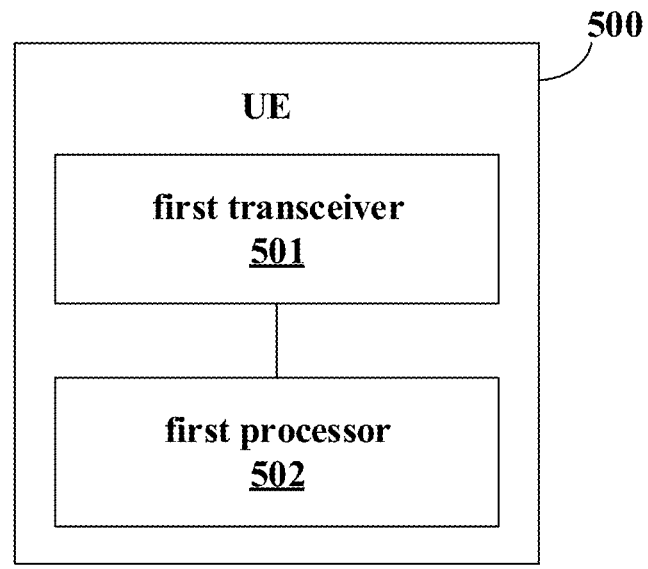
FIG. 5 is one of the structural diagrams of UE according to an embodiment of the disclosure.

Referring to FIG. 5, which shows the structure of a UE 500 according to an embodiment of the present disclosure. The UE 500 includes: a first transceiver 501 and a first processor 502.

The first transceiver 501 is configured to: receive first indication information sent by a network side device, where the first indication information is used to instruct the UE to send a first signal; the first processor 502 is configured to: when the network side device does not clearly indicate first uplink transmission characteristic of the first signal, determine actual first uplink transmission characteristic of the first signal, and send the first signal through the first uplink transmission characteristic, or when the network side device does not clearly indicate the first uplink transmission characteristic of the first signal, not send the first signal.

In the embodiment of the present disclosure, optionally, the first processor 502 is further configured to determine whether the network side device clearly indicates the first uplink transmission characteristic of the first signal.

In the embodiment of the present disclosure, optionally, the first processor 502 is further configured to: determine whether to use the first uplink transmission characteristic to send the first signal.

When the first uplink transmission characteristic needs to be used to send the first signal, it is determined whether the network side device clearly indicates the first uplink transmission characteristic of the first signal.

In the embodiment of the present disclosure, optionally, the first receiver 501 is further configured to: receive second indication information about the first uplink transmission characteristic from the network side device, and the second indication information is used to indicate whether the UE performs the transmission of the first signal transmission under the first uplink transmission characteristic, the first processor 502 is further configured to: determine whether to perform the transmission of the first signal under the first uplink transmission characteristic based on the second indication information. Or the first processor 502 is further configured to determine whether the third indication information sent by the network side device is received, and it is determined whether to transmit the first signal by using the first uplink transmission characteristic based on whether the third indication information sent by the network side device is received. Or the first processor 502 is further configured to: if the fourth indication information that the first uplink transmission characteristic is no longer used for the transmission of the first signal is not received, use the first uplink transmission characteristic for the transmission of the first signal; otherwise, not use the first uplink transmission characteristic for the transmission of the first signal.

In the embodiment of the present disclosure, optionally, the first processor 502 is further configured to: determine the first uplink transmission characteristic of the first signal based on the downlink receiving signal; or determine that the actual first uplink transmission characteristic of the first signal is the same as the first uplink transmission characteristic of the third signal.

In the embodiment of the present disclosure, optionally, the first transceiver 501 is further configured to: send the actual indication information of the first uplink transmission characteristic to the network side device.

In the embodiment of the present disclosure, optionally, the indication information of the actual first uplink transmission characteristic includes: indication information for indicating one or more channel state information reference signal (CSI-RS) resource among a plurality of CSI-RS resources configured by the network side device for the UE for beam management; or indication information for indicating one or more CSI-RS resource from a plurality of CSI-RS resources configured by the network side device for the UE for uplink beam management; or indication information for indicating one or more CSI-RS resource from a plurality of CSI-RS resources configured by the network side device for the UE for downlink CSI acquisition; or indication information for indicating one or more DMSR ports from the downlink DMRS ports configured by the network side device for the UE; or indication information for indicating one SRS resource from the SRS resources configured by the network side device for the UE.

In the embodiment of the present disclosure, optionally, the first transceiver 501 is further configured to: send the indication information of the actual first uplink transmission characteristic to the network side device through another first signal; or send the indication information of the actual first uplink transmission characteristic to the network side device through the first signal.

In the embodiment of the present disclosure, optionally, the actual first uplink transmission characteristic of the first signal refers to any one of the following: the first uplink transmission characteristic clearly indicated by the network side device most recently; the first uplink transmission characteristic of the first signal clearly indicated by the network side device most recently; the first uplink transmission characteristic used by the UE most recently; the first uplink transmission characteristic used by the UE for transmitting the first signal most recently; and the default first uplink transmission characteristic.

In the embodiments of the present disclosure, optionally, the first uplink transmission characteristic clearly indicated most recently refers to any one of the following: one pre-defined first uplink transmission characteristics among the N first uplink transmission characteristics of uplink signal transmission configured by RRC most recently, N is greater than or equal to 1; and the first uplink transmission characteristic of the uplink signal transmission activated by MAC-CE most recently.

In the embodiments of the present disclosure, optionally, the default first uplink transmission characteristic refers to any one of the following: the first uplink transmission characteristic used in the transmission of the third message Msg3 in the most recent random access channel (RACH) process; one pre-defined first uplink transmission characteristics among the N first uplink transmission characteristics configured by RRC most recently, N is greater than or equal to 1; and the first uplink transmission characteristic activated by MAC-CE most recently.

In the embodiment of the present disclosure, optionally, when N is greater than 1, the predefined first uplink transmission characteristic refers to: the first uplink transmission characteristics having the lowest serial number among the N first uplink transmission characteristics configured by RRC most recently; when N is equal to 1, the predefined first uplink transmission characteristic refers to: one first uplink transmission characteristic configured by RRC most recently.

In the embodiment of the present disclosure, optionally, the first processor is further configured to: if the UE has not received the initial RRC configuration including the first uplink transmission characteristic configuration information, determine that the network side device does not clearly indicate the first uplink transmission characteristic of the first signal; if the UE has received the initial RRC configuration including the first uplink transmission characteristic configuration information, but has not received the associated MAC-CE activation signaling, determine that the network side device does not clearly indicate the first uplink transmission characteristic of the first signal; if the UE has received RRC reconfiguration information including the configuration information of the first uplink transmission characteristics, but has not yet received the associated MAC-CE activation information, determine that the network side device does not clearly indicate the first uplink transmission characteristic of the first signal; or if the UE has received the RRC configuration including the configuration information of the first uplink transmission characteristic and the first MAC-CE activation information and the second MAC-CE activation information or reactivation information associated with the RRC configuration, but the uplink transmission characteristic activated by the second MAC-CE activation information or reactivation information is not valid yet, determine that the network side device does not clearly indicate the first uplink transmission characteristic of the first signal.

In the embodiment of the present disclosure, whether the network side device clearly indicates the first uplink transmission characteristic of the first signal specifically refers to whether the UE obtains valid first uplink transmission characteristic of the first signal. Correspondingly, the network side device does not clearly indicate the first uplink transmission characteristic of the first signal specifically refers to that the UE has not obtained the valid first uplink transmission characteristic of the first signal. The first uplink transmission characteristic clearly indicated by the network side device may specifically refer to the valid first uplink transmission characteristic obtained by the UE.

Figure 6:
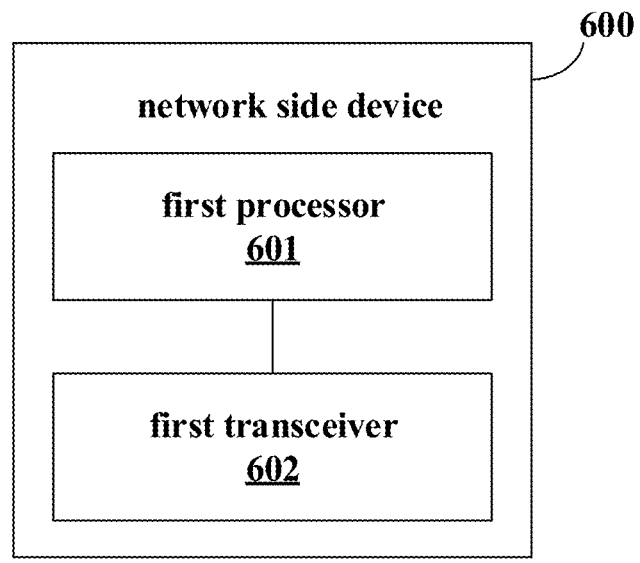
FIG. 6 is one of the structural diagrams of the network side device of the embodiment of the disclosure.

Referring to FIG. 6, which shows the structure of a network side device according to an embodiment of the present disclosure. The network side device 600 includes a second processor 601 and a second transceiver 602.

The second transceiver 602 is configured to send first indication information to a UE, where the first indication information is used to instruct the UE to send a first signal.

The second transceiver 602 is further configured to: when the network side device does not clearly indicate first uplink transmission characteristic of the first signal, determine a receiving mode corresponding to actual first uplink transmission characteristic of the first signal, and receive the first signal through the receiving mode, or when the network side device does not clearly indicate the first uplink transmission characteristic of the first signal, not receive the first signal on a resource scheduled for the first signal.

In the embodiment of the present disclosure, optionally, the second transceiver 602 is further configured to: send second indication information to the UE, the second indication information is used to indicate whether the UE performs the transmission of the first signal under the first uplink transmission characteristic; or send third indication information to the UE, where the third indication information is used to indicate that the UE needs to use the first uplink transmission characteristic to transmit the first signal; or send fourth indication information to the UE, where the fourth indication information is used to indicate that the UE no longer uses the first uplink transmission characteristic to transmit the first signal.

In the embodiment of the present disclosure, optionally, the second transceiver 602 is further configured to: obtain indication information of the actual first uplink transmission characteristic from other received first signals, or obtain the indication information of the actual first uplink transmission characteristic from the received first signal.

In the embodiment of the present disclosure, optionally, the indication information of the actual first uplink transmission characteristic includes: the indication information indicating one or more CSI-RS resources among the a plurality of CSI-RS resources configured by the network side device for the UE; or indication information indicating one or more CSI-RS resources among the plurality of CSI-RS resources used for uplink beam management configured by the network side device for the UE; or indication information indicating one or more CSI-RS resources among the a plurality of CSI-RS resources used for downlink CSI acquisition configured by the network side device for the UE; or indication information indicating one or more DMSR ports in the downlink demodulation reference signal (DMRS) ports configured by the network side device for the UE; or indication information indicating one channel detection SRS resource in the SRS resources configured by the network side device for the UE.

In the embodiment of the present disclosure, optionally, the actual first uplink transmission characteristic of the first signal refers to any one of the following: the first uplink transmission characteristic clearly indicated by the network side device most recently; the first uplink transmission characteristic of the first signal clearly indicated by the network side device most recently; the first uplink transmission characteristic used by the UE most recently; the first uplink transmission characteristic used by the UE for transmitting the first signal most recently; and the default first uplink transmission characteristic.

In the embodiment of the present disclosure, optionally, the clearly indicated first uplink transmission characteristic most recently refers to any one of the following: one predefined first uplink transmission characteristic among the N first uplink transmission characteristics corresponding to the first signal configured by RRC most recently, N is greater than or equal to 1; or the first uplink transmission characteristic activated by MAC-CE most recently.

In the embodiment of the present disclosure, optionally, the default first uplink transmission characteristic refers to any one of the following: the first uplink transmission characteristic used in the transmission of the third message Msg3 in the most recent random access channel (RACH) process; one pre-defined first uplink transmission characteristics among the N first uplink transmission characteristics configured by RRC most recently, N is greater than or equal to 1; and the first uplink transmission characteristic activated by MAC-CE most recently.

In the embodiment of the present disclosure, optionally, when N is greater than 1, the predefined first uplink transmission characteristic refers to: the first uplink transmission characteristics having the lowest serial number among the N first uplink transmission characteristics configured by RRC most recently; when N is equal to 1, the predefined first uplink transmission characteristic refers to: one first uplink transmission characteristic configured by RRC most recently.

In the embodiment of the present disclosure, optionally, the first uplink transmission characteristic is an uplink transmission beam.

In the embodiment of the present disclosure, whether the network side device clearly indicates the first uplink transmission characteristic of the first signal specifically refers to whether the network side device sends valid first uplink transmission characteristic of the first signal to the UE. Correspondingly, the network side device does not clearly indicate the first uplink transmission characteristic of the first signal specifically refers to that the network side device has not sent the valid first uplink transmission characteristic of the first signal to the UE. The first uplink transmission characteristic clearly indicated by the network side device may specifically refer to the valid first uplink transmission characteristic sent by the network side device to the UE.

Figure 7:
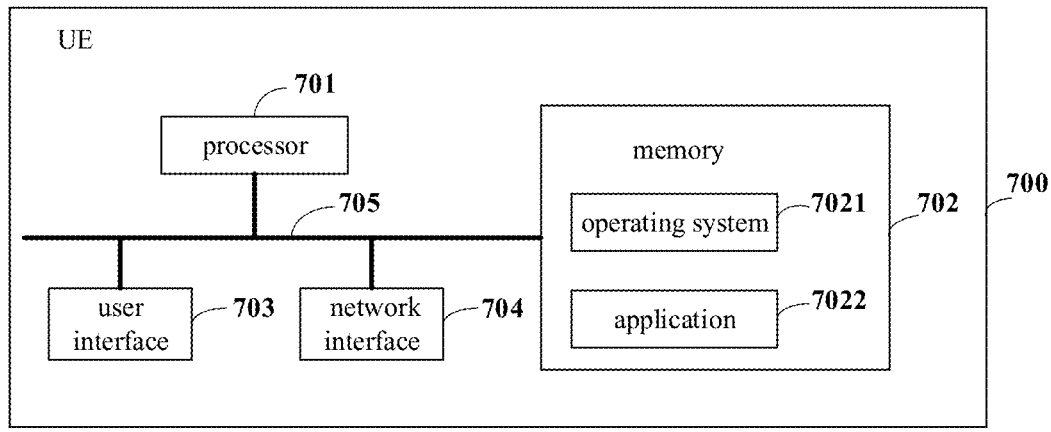
FIG. 7 is the second structural diagram of the UE according to an embodiment of the disclosure.

As shown in FIG. 7, the UE 700 shown in FIG. 7 includes: at least one processor 701, a memory 702, at least one network interface 704, and a user interface 703. The various components in the UE 700 are coupled together through the bus system 705. It can be understood that the bus system 705 is used to implement connection and communication among these components. In addition to the data bus, the bus system 705 further includes a power bus, a control bus, and a status signal bus. However, for clarity of description, various buses are marked as the bus system 705 in FIG. 7.

Wherein, the user interface 703 may include a display, a keyboard, a pointing device (for example, a mouse, a trackball), a touch panel, or a touch screen.

It can be understood that the memory 702 in the embodiment of the present disclosure may be a volatile memory or a non-volatile memory, or may include both volatile and non-volatile memory. Among them, the non-volatile memory can be read-only memory (ROM), programmable read-only memory (PROM), erasable programmable read-only memory (EPROM), and electrically available Erase programmable read-only memory (EEPROM) or flash memory. The volatile memory may be a random access memory (RAM), which is used as an external cache. By way of exemplary but not restrictive description, many forms of RAM are available, such as static random access memory (SRAM), dynamic random access memory (DRAM), synchronous dynamic random access memory (SDRAM), Double Data rate SDRAM (DDRSDRAM), Enhanced Synchronous Dynamic Random Access Memory (ESDRAM), Synchronous Link Dynamic Random Access Memory (SLDRAM) and Direct Rambus RAM (DRRAM). The memory 702 of the system and method described in the embodiments of the present disclosure is intended to include but not limited to these and any other suitable types of memory.

In some embodiments, the memory 702 stores the following elements, executable modules or data structures, or a subset of them, or an extended set of them: an operating system 7021 and an application 7022.

Among them, the operating system 7021 includes various system programs, such as a framework layer, a core library layer, and a driver layer, which are used to implement various basic services and process hardware-based tasks. The application program 7022 includes various application programs, such as a media player, a browser, etc., which are used to implement various application services. A program for implementing the method of the embodiments of the present disclosure may be included in the application program 7022.

In the embodiment of the present disclosure, by calling a program or instruction stored in the memory 702, specifically, a program or instruction stored in the application program 7022, the data transmission process is realized.

The UE provided in the embodiments of the present disclosure can execute the foregoing method embodiments, and its implementation principles and technical effects are similar, and details are not described herein again in this embodiment.

Figure 8:
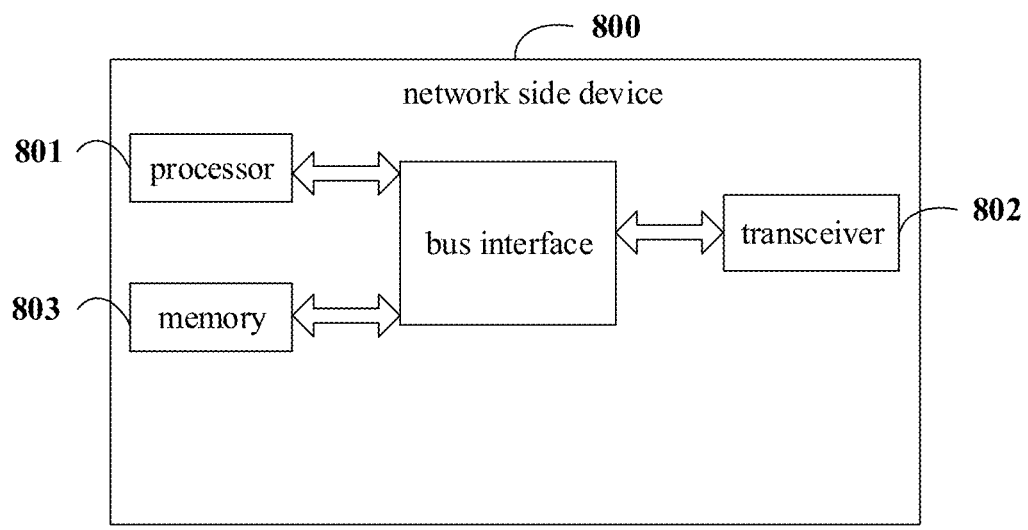
FIG. 8 is the second structural diagram of the network side device of the embodiment of the disclosure.

FIG. 8 is a structural diagram of a network side device applied in an embodiment of the present disclosure. As shown in FIG. 8, the network side device 800 includes: a processor 801, a transceiver 802, a memory 803, and a bus interface.

In the embodiment of the present disclosure, the network side device 800 further includes: a computer program stored in the memory 803 and executed by the processor 801, and the computer program is executed by the processor 801 to realize a data transmission process.

In FIG. 8, the bus architecture may include any number of interconnected buses and bridges. Specifically, various circuits of one or more processors represented by the processor 801 and the memory represented by the memory 803 are linked together. The bus architecture can also link various other circuits such as peripherals, voltage regulators, power management circuits, etc., which are all known in the art, and therefore, no further description will be given herein. The bus interface provides the interface. The transceiver 802 may be a plurality of elements, that is, include a transmitter and a receiver, and provide a unit for communicating with various other devices on a transmission medium.

The processor 801 is responsible for managing the bus architecture and general processing, and the memory 803 can store data used by the processor 801 when performing operations.

The network side device provided in the embodiments of the present disclosure can execute the foregoing method embodiments, and its implementation principles and technical effects are similar, and details are not described herein again in this embodiment.

The steps of the method or algorithm described in conjunction with the disclosure of the present disclosure may be implemented in a hardware manner, or may be implemented in a manner in which a processor executes software instructions. The software instructions can be composed of corresponding software modules, and the software modules can be stored in RAM, flash memory, ROM, EPROM, EEPROM, registers, hard disks, mobile hard disks, read-only optical disks, or any other form of storage medium known in the art. An exemplary storage medium is coupled to the processor, so that the processor can read information from the storage medium and can write information to the storage medium. Of course, the storage medium may also be an integral part of the processor. The processor and the storage medium may be located in one ASIC. In addition, the ASIC may be located in the core network interface device.

Of course, the processor and the storage medium may also exist as discrete components in the core network interface device.

Those skilled in the art should be aware that in one or more of the above examples, the functions described in the present disclosure can be implemented by hardware, software, firmware, or any combination thereof. When implemented by software, these functions can be stored in a computer-readable medium or transmitted as one or more instructions or codes on the computer-readable medium. Computer readable media include computer storage media and communication media, where communication media includes any media that facilitates the transfer of computer programs from one place to another. The storage medium may be any available medium that can be accessed by a general-purpose or special-purpose computer.

The specific embodiments described above further describe the purpose, technical solutions and beneficial effects of the present disclosure in further detail. It should be understood that the above descriptions are only specific embodiments of the present disclosure and are not intended to limit the disclosure. Any modification, equivalent replacement, improvement, etc. made on the basis of the technical solution of the present disclosure shall be included in the protection scope of the present disclosure.

Those skilled in the art should understand that the embodiments of the present disclosure may be provided as methods, systems, or computer program products. Therefore, the embodiments of the present disclosure may adopt the form of a complete hardware embodiment, a complete software embodiment, or an embodiment combining software and hardware. Moreover, the embodiments of the present disclosure may adopt the form of a computer program product implemented on one or more computer-usable storage media (including but not limited to disk storage, CD-ROM, optical storage, etc.) containing computer program codes.

The embodiments of the present disclosure are described with reference to flowcharts and/or block diagrams of methods, devices (systems), and computer program products according to the embodiments of the present disclosure. It should be understood that each process and/or block in the flowchart and/or block diagram, and the combination of processes and/or blocks in the flowchart and/or block diagram can be realized by computer program instructions. These computer program instructions can be provided to the processor of a general-purpose computer, a special-purpose computer, an embedded processor, or other programmable data processing equipment to generate a machine, so that the instructions executed by the processor of the computer or other programmable data processing equipment generates a device that realizes the functions specified in one process or a plurality of processes in the flowchart and/or one block or a plurality of blocks in the block diagram.

These computer program instructions can also be stored in a computer-readable memory that can direct a computer or other programmable data processing equipment to work in a specific manner, so that the instructions stored in the computer-readable memory produce an article of manufacture including the instruction device. The instruction device implements the functions specified in one process or a plurality of processes in the flowchart and/or one block or a plurality of blocks in the block diagram.

These computer program instructions can also be loaded on a computer or other programmable data processing equipment, so that a series of operation steps are executed on the computer or other programmable equipment to produce computer-implemented processing, so as to execute on the computer or other programmable equipment. Instructions executed by the computer or other programmable data processing equipment provide steps for implementing functions specified in a flow or a plurality of flows in the flowchart and/or a block or a plurality of blocks in the block diagram.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A data transmission method applied to a user equipment (UE), comprising:
   receiving first indication information sent by a network side device, wherein the first indication information is used to instruct the UE to send a first signal; and
   determining actual first uplink transmission characteristic of the first signal when valid first uplink transmission characteristic of the first signal is not obtained, and sending the first signal to the network side device through the actual first uplink transmission characteristic, or not sending the first signal to the network side device when valid first uplink transmission characteristic of the first signal is not obtained;
   wherein the valid first uplink transmission characteristic of the first signal is not obtained includes at least one of:
   the UE has not received the configuration information of the first uplink transmission characteristic of the first signal;
   the UE has received the configuration information of the first uplink transmission characteristic of the first signal, but the UE has not received activation information corresponding to the configuration information;
   the UE has received the configuration information of the first uplink transmission characteristic of the first signal and the activation information corresponding to the configuration information, but the first uplink transmission characteristic of the first signal is not valid yet;
   the UE has received reconfiguration information of the first uplink transmission characteristic of the first signal, but the UE has not received the activation information corresponding to the reconfiguration information;
   the UE has received the reconfiguration information of the first uplink transmission characteristic of the first signal and the activation information corresponding to the reconfiguration information, but the first uplink transmission characteristic information of the first signal corresponding to the activation information is not valid yet; or,
   the UE has received reactivation information of the first uplink transmission characteristic, but the first uplink transmission characteristic of the first signal corresponding to the reactivation information is not valid yet.

2. The method according to claim 1, further comprising:
   determining whether the UE has obtained the valid first uplink transmission characteristic of the first signal,
   wherein the determining whether the UE has obtained the valid first uplink transmission characteristic of the first signal comprises:

determining whether the UE uses first uplink transmission characteristic to send the first signal;

determining whether the UE has obtained the valid first uplink transmission characteristic of the first signal when it is determined that the UE uses the first uplink transmission characteristic to send the first signal, wherein the determining whether the UE uses the first uplink transmission characteristic to send the first signal includes at least one of:

receiving second indication information about the first uplink transmission characteristic from the network side device, and determining whether to perform the transmission of the first signal under the first uplink transmission characteristic based on the second indication information; or determining whether third indication information has been received, and determining whether to transmit the first signal by using the first uplink transmission characteristic based on whether the third indication information has been received, wherein the third indication information is used to indicate the UE to use the first uplink transmission characteristic for the transmission of the first signal; or determining whether fourth indication information has been received, and determining whether to transmit the first signal by using the first uplink transmission characteristic based on whether the fourth indication information has been received, wherein the fourth indication information is used to indicate not to use the first uplink transmission characteristic for the transmission of the first signal any more.

3. The method according to claim 1, wherein the determining the actual first uplink transmission characteristic of the first signal comprises:

determining the actual first uplink transmission characteristic of the first signal based on a downlink reception signal; or determining that the actual first uplink transmission characteristic of the first signal is the same as the first uplink transmission characteristic of a signal associated with the first signal.

4. The method according to claim 1, wherein after determining the actual first uplink transmission characteristic of the first signal, the method further comprises:

sending indication information of the actual first uplink transmission characteristic to the network side device.

5. The method according to claim 4, wherein the indication information of the actual first uplink transmission characteristic comprises:

indication information for indicating one or more channel state information reference signal (CSI-RS) resource from a plurality of CSI-RS resources configured by the network side device for the UE for beam management, wherein the plurality of CSI-RS resources for beam management comprises at least one of CSI-RS resources for uplink beam management and CSI-RS resources for downlink beam management; or indication information for indicating one or more CSI-RS resource from a plurality of CSI-RS resources configured by the network side device for the UE for downlink CSI acquisition; or indication information for indicating one or more downlink demodulation reference signal (DMSR) ports from downlink DMRS ports configured by the network side device for the UE; or indication information for indicating one SRS resource from the SRS resources configured by the network side device for the UE.

6. The method according to claim 1, wherein the actual first uplink transmission characteristic of the first signal refers to any one of:

valid first uplink transmission characteristic obtained most recently among all valid first uplink transmission characteristics obtained by the UE;

valid first uplink transmission characteristic obtained most recently among all valid first uplink transmission characteristics of the first signal obtained by the UE;

first uplink transmission characteristic used most recently among all the first uplink transmission characteristics used by the UE;

first uplink transmission characteristic used most recently among all the first uplink transmission characteristics used by the UE to send the first signal; or, default first uplink transmission characteristic.

7. The method according to claim 6, wherein when the actual first uplink transmission characteristic of the first signal is the valid first uplink transmission characteristic obtained most recently among all the valid first uplink transmission characteristics obtained by the UE, the valid first uplink transmission characteristic obtained most recently refers to: one pre-defined first uplink transmission characteristics among the N first uplink transmission characteristics configured by radio resource control (RRC) most recently, and N is greater than or equal to 1; or when the actual first uplink transmission characteristic of the first signal is the valid first uplink transmission characteristic obtained most recently among all the valid first uplink transmission characteristics of the first signal obtained by the UE, the valid first uplink transmission characteristic obtained most recently refers to: one predefined first uplink transmission characteristics among the N first uplink transmission characteristics corresponding to the first signal configured by RRC most recently, N is greater than or equal to 1; or, the valid first uplink transmission characteristic obtained most recently refers to: the first uplink transmission characteristic activated by media access control layer control unit (MAC-CE) most recently.

8. The method according to claim 6, wherein the default first uplink transmission characteristic refers to any one of:

first uplink transmission characteristic used for the transmission of a third message Msg3 in a most recent random access channel (RACH) process;

one pre-defined first uplink transmission characteristics among the N first uplink transmission characteristics configured by RRC most recently, N is greater than or equal to 1; or, the first uplink transmission characteristic activated by MAC-CE most recently.

9. A data transmission method applied to network side device, comprising:

sending first indication information to a user equipment (UE), wherein the first indication information is used to instruct the UE to send a first signal;

determining a receiving mode corresponding to actual first uplink transmission characteristic of the first signal when valid first uplink transmission characteristic of the first signal is not sent to the UE, and receiving the first signal by the receiving mode, or not receiving the first signal on a resource scheduled for the first signal when valid first uplink transmission characteristic of the first signal is not sent to the UE;

wherein the valid first uplink transmission characteristic of the first signal is not sent to the UE includes at least one of:

not sending configuration information of the first uplink transmission characteristic of the first signal to the UE;

sending configuration information of the first uplink transmission characteristic of the first signal to the UE, but not sending activation information corresponding to the configuration information to the UE;

sending the configuration information of the first uplink transmission characteristic of the first signal and the activation information corresponding to the configuration information to the UE, but the first uplink transmission characteristic of the first signal is not valid;

sending reconfiguration information of the first uplink transmission characteristic of the first signal to the UE, but not sending the activation information corresponding to the reconfiguration information to the UE;

sending the reconfiguration information of the first uplink transmission characteristic of the first signal and the activation information corresponding to the reconfiguration information to the UE, but the first uplink transmission characteristic information of the first signal corresponding to the activation information is not valid; or, sending reactivation information of the first uplink transmission characteristic to the UE, but the first uplink transmission characteristic of the first signal corresponding to the reactivation information is not valid.

10. The method according to claim 9, further comprising at least one of:

sending second indication information to the UE, wherein the second indication information is used to indicate whether the UE performs the transmission of the first signal under the first uplink transmission characteristic; or sending third indication information to the UE, wherein the third indication information is used to instruct the UE to use the first uplink transmission characteristic to transmit the first signal; or sending fourth indication information to the UE, wherein the fourth indication information is used to instruct the UE to no longer use the first uplink transmission characteristic to perform the transmission of the first signal.

11. The method according to claim 9, further comprising:

obtaining indication information of the actual first uplink transmission characteristic of the first signal sent by the UE.

12. The method according to claim 10, wherein the actual first uplink transmission characteristic refers to any one of:

valid first uplink transmission characteristic sent most recently among all valid first uplink transmission characteristics sent to the UE;

valid first uplink transmission characteristic sent most recently among all valid first uplink transmission characteristics of the first signal sent to the UE;

first uplink transmission characteristic used most recently among all the first uplink transmission characteristics used by the UE;

first uplink transmission characteristic used most recently among all the first uplink transmission characteristics used by the UE to send the first signal; or, default first uplink transmission characteristic.

13. The method according to claim 12, wherein:

when the actual first uplink transmission characteristic of the first signal is the valid first uplink transmission characteristic sent most recently among all the valid first uplink transmission characteristics sent to the UE, the valid first uplink transmission characteristic sent most recently refers to: one pre-defined first uplink transmission characteristics among the N first uplink transmission characteristics configured by radio resource control (RRC) most recently, and N is greater than or equal to 1; or when the actual first uplink transmission characteristic of the first signal is the valid first uplink transmission characteristic sent most recently among all the valid first uplink transmission characteristics of the first signal sent to the UE, the valid first uplink transmission characteristic sent most recently refers to: one pre-defined first uplink transmission characteristics among the N first uplink transmission characteristics corresponding to the first signal configured by RRC most recently, N is greater than or equal to 1; or, the valid first uplink transmission characteristic sent most recently refers to: the first uplink transmission characteristic activated by media access control layer control unit (MAC-CE) most recently.

14. The method according to claim 12, wherein the default first uplink transmission characteristic refers to any one of:

first uplink transmission characteristic used for the transmission of a third message Msg3 in a most recent random access channel (RACH) process;

one pre-defined first uplink transmission characteristics among the N first uplink transmission characteristics configured by RRC most recently, N is greater than or equal to 1; or, the first uplink transmission characteristic activated by MAC-CE most recently.

15. A UE comprising: a processor, a memory, and a program stored on the memory and running on the processor, wherein the program is executed by the processor to implement the following steps:

receiving first indication information sent by a network side device, wherein the first indication information is used to instruct the UE to send a first signal; and determining actual first uplink transmission characteristic of the first signal when valid first uplink transmission characteristic of the first signal is not obtained, and sending the first signal to the network side device through the actual first uplink transmission characteristic, or not sending the first signal to the network side device when valid first uplink transmission characteristic of the first signal is not obtained;

wherein the valid first uplink transmission characteristic of the first signal is not obtained includes at least one of:

the UE has not received the configuration information of the first uplink transmission characteristic of the first signal;

the UE has received the configuration information of the first uplink transmission characteristic of the first signal, but the UE has not received activation information corresponding to the configuration information;

the UE has received the configuration information of the first uplink transmission characteristic of the first signal and the activation information corresponding to the configuration information, but the first uplink transmission characteristic of the first signal is not valid yet;

the UE has received reconfiguration information of the first uplink transmission characteristic of the first signal, but the UE has not received the activation information corresponding to the reconfiguration information;

the UE has received the reconfiguration information of the first uplink transmission characteristic of the first signal and the activation information corresponding to the reconfiguration information, but the first uplink transmission characteristic information of the first signal corresponding to the activation information is not valid yet; or, the UE has received reactivation information of the first uplink transmission characteristic, but the first uplink transmission characteristic of the first signal corresponding to the reactivation information is not valid yet.

16. A network side device, comprising: a processor, a memory, and a program stored on the memory and running on the processor, wherein the program is executed by the processor to implement the steps of data transmission method according to claim 9.

17. The UE according to claim 15, wherein the actual first uplink transmission characteristic of the first signal refers to any one of:

valid first uplink transmission characteristic obtained most recently among all valid first uplink transmission characteristics obtained by the UE;

valid first uplink transmission characteristic obtained most recently among all valid first uplink transmission characteristics of the first signal obtained by the UE;

first uplink transmission characteristic used most recently among all the first uplink transmission characteristics used by the UE;

first uplink transmission characteristic used most recently among all the first uplink transmission characteristics used by the UE to send the first signal; or, default first uplink transmission characteristic.

18. The network side device according to claim 16, wherein the actual first uplink transmission characteristic of the first signal refers to any one of:

valid first uplink transmission characteristic obtained most recently among all valid first uplink transmission characteristics obtained by the UE;

valid first uplink transmission characteristic obtained most recently among all valid first uplink transmission characteristics of the first signal obtained by the UE;

first uplink transmission characteristic used most recently among all the first uplink transmission characteristics used by the UE;

first uplink transmission characteristic used most recently among all the first uplink transmission characteristics used by the UE to send the first signal; or, default first uplink transmission characteristic.

19. The UE according to claim 15, wherein the determining the actual first uplink transmission characteristic of the first signal comprises:

determining the actual first uplink transmission characteristic of the first signal based on a downlink reception signal; or determining that the actual first uplink transmission characteristic of the first signal is the same as the first uplink transmission characteristic of a signal associated with the first signal.

20. The network side device according to claim 16, wherein the program is further executed by the processor to implement at least one of:

sending second indication information to the UE, wherein the second indication information is used to indicate whether the UE performs the transmission of the first signal under the first uplink transmission characteristic; or sending third indication information to the UE, wherein the third indication information is used to instruct the UE to use the first uplink transmission characteristic to transmit the first signal; or sending fourth indication information to the UE, wherein the fourth indication information is used to instruct the UE to no longer use the first uplink transmission characteristic to perform the transmission of the first signal.

* * * * *